(12) United States Patent
Watanabe

(10) Patent No.: US 12,202,199 B2
(45) Date of Patent: *Jan. 21, 2025

(54) THREE-DIMENSIONAL SHAPING APPARATUS AND MANUFACTURING METHOD FOR THREE-DIMENSIONAL SHAPED OBJECT

(71) Applicant: SEIKO EPSON CORPORATION, Tokyo (JP)

(72) Inventor: Manabu Watanabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,234

(22) Filed: Sep. 15, 2022

(65) Prior Publication Data

US 2023/0078727 A1 Mar. 16, 2023

(30) Foreign Application Priority Data

Sep. 16, 2021 (JP) .................................. 2021-151413

(51) Int. Cl.
 B29C 64/35 (2017.01)
 B29C 64/118 (2017.01)
 (Continued)

(52) U.S. Cl.
 CPC ............ B29C 64/35 (2017.08); B29C 64/118 (2017.08); B29C 64/209 (2017.08);
 (Continued)

(58) Field of Classification Search
 CPC ....... B29C 64/35; B29C 48/272; B08B 1/002; B08B 1/008
 See application file for complete search history.

(56) References Cited

U.S. PATENT DOCUMENTS 10,702,039 B2 * 7/2020 Shimizu ................. A45D 29/14
2007/0085876 A1 * 4/2007 Harper ................. B41J 2/16538
347/33
(Continued)

FOREIGN PATENT DOCUMENTS

CN 101678383 A 3/2010
CN 204974541 U 1/2016
(Continued)

OTHER PUBLICATIONS https://www.youtube.com/watch?v=mUeDcgkfJoQV2: automatic hotend nozzle cleaner/brush (Year: 2015), 1 page with two screenshots.

*Primary Examiner* — Seyed Masoud Malekzadeh
*Assistant Examiner* — Vipul Malik
(74) *Attorney, Agent, or Firm* — Harness, Dickey & Pierce, P.L.C.

(57) ABSTRACT

A three-dimensional shaping apparatus includes an ejecting section configured to eject a shaping material from a nozzle, a stage on which the shaping material is stacked, a driving section configured to change relative positions of the ejecting section and the stage, a cleaning mechanism including a brush and a blade, and a control section. The control section causes, in cleaning processing, the nozzle to reciprocate to traverse the cleaning mechanism a plurality of times to execute a cleaning operation for bringing at least one of the brush and the blade and the nozzle to come into contact. The control section causes, in the cleaning operation, the nozzle to reciprocate to come into contact with the brush or the blade in different positions of the brush or the blade. Temperature of the nozzle in the cleaning operation is lower than temperature of the nozzle at a stacking time of layers.

15 Claims, 14 Drawing Sheets

(51) Int. Cl.
*B29C 64/209* (2017.01)
*B29C 64/393* (2017.01)
*B33Y 10/00* (2015.01)
*B33Y 30/00* (2015.01)
*B33Y 40/00* (2020.01)
*B33Y 50/02* (2015.01)
*B29K 55/02* (2006.01)

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12); *B29K 2055/02* (2013.01)

(56) References Cited

U.S. PATENT DOCUMENTS

| | | |
|---|---|---|
| 2007/0134035 A1 | 6/2007 | Kageyama |
| 2008/0317894 A1* | 12/2008 | Turley .................. B29C 64/209 425/226 |
| 2009/0035405 A1 | 2/2009 | Leavitt |
| 2012/0007932 A1 | 1/2012 | Yokoyama et al. |
| 2013/0241102 A1 | 9/2013 | Rodgers et al. |
| 2014/0125734 A1* | 5/2014 | Kobayashi ........... B41J 2/16544 347/33 |
| 2015/0158254 A1 | 6/2015 | Chang |
| 2015/0165694 A1 | 6/2015 | Lee et al. |
| 2016/0176120 A1* | 6/2016 | Skubic .................. B29C 64/118 29/428 |
| 2018/0001556 A1 | 1/2018 | Buller et al. |
| 2018/0117834 A1 | 5/2018 | Murao |
| 2019/0134907 A1* | 5/2019 | Hoechsmann ............ B08B 1/30 |
| 2020/0406548 A1 | 12/2020 | Yuwaki et al. |
| 2021/0178752 A1* | 6/2021 | Johnson ................. B41J 2/0451 |
| 2022/0134667 A1 | 5/2022 | Mansell et al. |
| 2022/0203617 A1 | 6/2022 | Pekic |

FOREIGN PATENT DOCUMENTS

| | | |
|---|---|---|
| CN | 111319367 A | 6/2020 |
| JP | 2003-502184 A | 1/2003 |
| JP | 2006-192710 A | 7/2006 |
| JP | 2010-530326 A | 9/2010 |
| JP | 2010-535117 A | 11/2010 |
| JP | 2015-112873 A | 6/2015 |
| JP | 2018-075825 A | 5/2018 |
| JP | 2020-069726 A | 5/2020 |
| TW | 200932547 A | 8/2009 |
| WO | 2000-078519 A1 | 12/2000 |
| WO | WO-2010001897 A1 * | 1/2010 ......... B01D 46/0001 |
| WO | WO-2020198881 A1 * | 10/2020 ............ B29C 35/16 |

* cited by examiner

THREE-DIMENSIONAL SHAPING APPARATUS AND MANUFACTURING METHOD FOR THREE-DIMENSIONAL SHAPED OBJECT

The present application is based on, and claims priority from JP Application Serial Number 2021-151413, filed Sep. 16, 2021, the disclosure of which is hereby incorporated by reference herein in its entirety.

BACKGROUND

1. Technical Field

The present disclosure relates to a three-dimensional shaping apparatus and a manufacturing method for a three-dimensional shaped object.

2. Related Art

JP-T-2010-530326 (Patent Literature 1) discloses a three-dimensional shaping apparatus including an end cleaning assembly including a flicker plate and a brush. The three-dimensional shaping apparatus brings an extrusion head into contact with the flicker plate and the brush to clean the extrusion head.

When the distal end of a head is caused to reciprocate with respect to a cleaning mechanism such as the flicker plate and the brush to perform cleaning, it is likely that a waste material adhering to the cleaning mechanism adheres to the head again and affects shaping accuracy.

SUMMARY

According to a first aspect of the present disclosure, a three-dimensional shaping apparatus is provided. The three-dimensional shaping apparatus includes: an ejecting section including a plasticizing mechanism for plasticizing a plasticizing material and generating a shaping material and a nozzle and configured to eject the shaping material from the nozzle; a stage on which the shaping material is stacked; a driving section configured to change relative positions of the ejecting section and the stage; a cleaning mechanism including a brush and a blade; and a control section configured to execute cleaning processing for cleaning the nozzle and control the ejecting section and the driving section to stack layers on the stage. The brush and the blade are disposed at height where the brush and the blade come into contact with the nozzle. The brush and the blade have a melting point higher than a plasticizing temperature of the plasticizing material and have hardness lower than hardness of the nozzle. The control section causes, in the cleaning processing, the nozzle to reciprocate to traverse the cleaning mechanism a plurality of times to execute a cleaning operation for bringing at least one of the brush and the blade and the nozzle to come into contact. The control section causes, in the cleaning operation, the nozzle to reciprocate to come into contact with the brush or the blade in different positions of the brush or the blade. Temperature of the nozzle in the cleaning operation is lower than temperature of the nozzle at a stacking time of the layers.

According to a second aspect of the present disclosure, there is provided a manufacturing method for a three-dimensional shaped object in a three-dimensional shaping apparatus including: an ejecting section including a plasticizing mechanism for plasticizing a plasticizing material and generating a shaping material and a nozzle and configured to eject the shaping material from the nozzle; a stage on which the shaping material is stacked; a driving section configured to change relative positions of the ejecting section and the stage; and a cleaning mechanism including a brush and a blade, the brush and the blade being disposed at height where the brush and the blade come into contact with the nozzle, the brush and the blade having a melting point higher than a plasticizing temperature of the plasticizing material and having hardness lower than hardness of the nozzle. The manufacturing method includes: a stacking step for controlling the ejecting section and the driving section to stack layers on the stage; and a cleaning step for causing the nozzle to reciprocate to traverse the cleaning mechanism a plurality of times to execute a cleaning operation for bringing at least one of the brush and the blade and the nozzle to come into contact. In the cleaning step, in the cleaning operation, the nozzle is caused to reciprocate to come into contact with the brush or the blade in different positions of the brush or the blade. Temperature of the nozzle in the cleaning operation is lower than temperature of the nozzle at a stacking time of the layers.

DESCRIPTION OF EXEMPLARY EMBODIMENTS

A. First Embodiment

Figure 1:
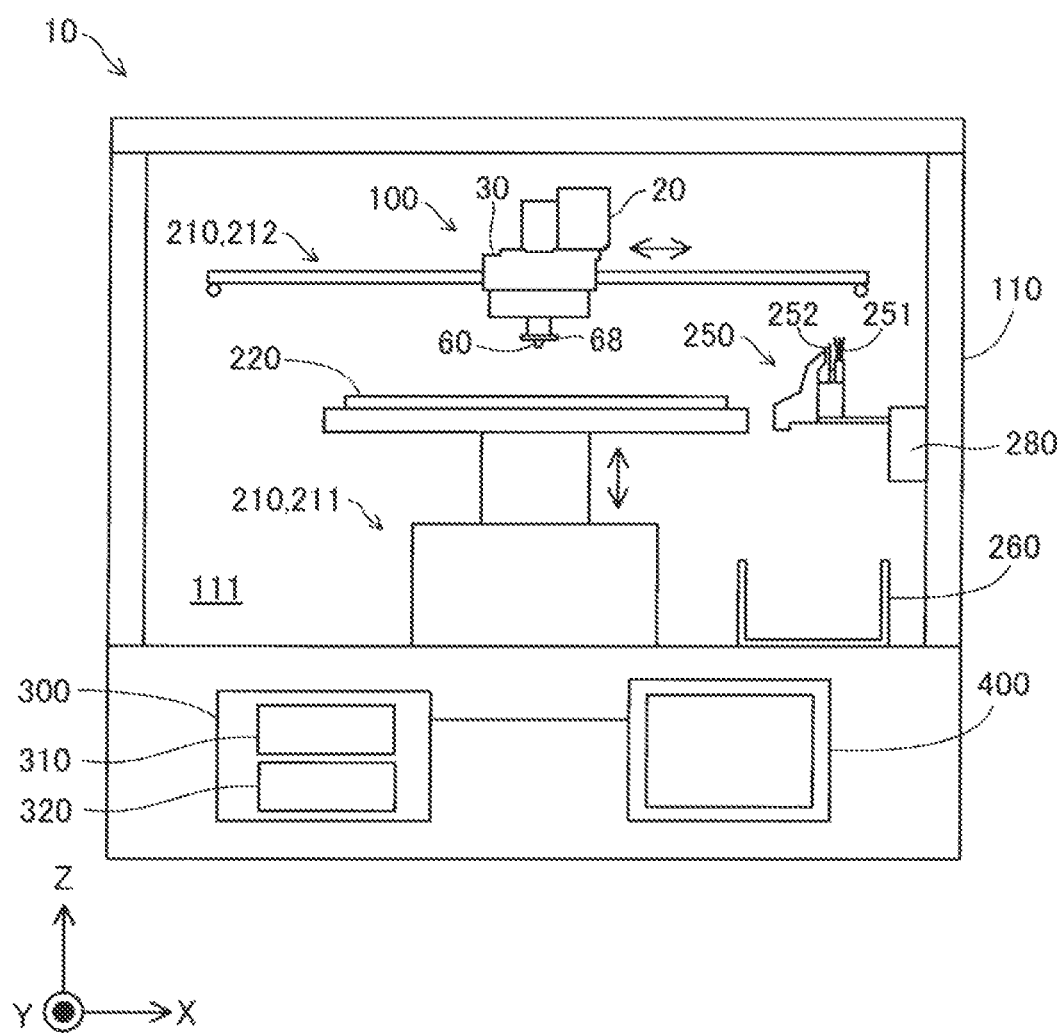
FIG. 1 is a diagram showing a schematic configuration of a three-dimensional shaping apparatus in a first embodiment.

FIG. 1 is a diagram showing a schematic configuration of a three-dimensional shaping apparatus 10 in a first embodiment. In FIG. 1, arrows along X, Y, and Z directions orthogonal to one another are shown. The X, Y, and Z directions are directions along an X axis, a Y axis, and a Z axis, which are three spatial axes orthogonal to one another. The X, Y, and Z directions respectively include both of directions on one side along the X axis, the Y axis, and the Z axis and opposite directions of the directions. The X axis and the Y axis are axes along the horizontal plane. The Z axis is an axis along the vertical line. A −Z direction is the vertical direction and a +Z direction is a direction opposite to the vertical direction. The −Z direction is referred to as "downward" as well and the +Z direction is referred to as "upward" as well. The X, Y, and Z directions in FIG. 1 and the X, Y, and z directions in the other figures represent the same directions.

The three-dimensional shaping apparatus 10 in this embodiment includes an ejecting section 100, a material storing section 20, a housing 110, a driving section 210, a stage 220, a cleaning mechanism 250, a control section 300, and a display device 400 functioning as an informing section.

The ejecting section 100 includes a plasticizing mechanism 30 that plasticizes at least a part of a plasticizing material supplied from the material storing section 20 and generates a shaping material and a nozzle 60. The ejecting section 100 ejects the shaping material plasticized by the plasticizing mechanism 30 from the nozzle 60 toward the stage 220. The ejecting section 100 is called ejection head, discharging section, discharge head, extruding section, or extrusion head as well or is simply called head as well. In this specification, "ejection" includes meaning of "discharge" or "extrusion".

The housing 110 includes a shaping space 111 on the inside. In the shaping space 111, the stage 220 on which the shaping material is stacked is disposed. In the housing 110, for example, an opening for causing the shaping space 111 and the outside to communicate and a door for opening and closing the opening may be provided. A user can take out a shaped object shaped on the stage 220 from the opening by opening the door to open the opening.

The driving section 210 changes relative positions of the ejecting section 100 and the stage 220. In this embodiment, the driving section 210 includes a first driving section 211 that moves the stage 220 in the Z direction and a second driving section 212 that moves the ejecting section 100 in the X direction and the Y direction. The first driving section 211 is configured as a lifting and lowering device and includes a motor for moving the stage 220 in the Z direction. The second driving section 212 is configured as a horizontal conveying device and includes a motor for sliding the ejecting section 100 in the X direction and a motor for sliding the ejecting section 100 in the Y direction. The motors are driven under control by the control section 300. In other embodiments, the driving section 210 may be configured to move the stage 220 or the ejecting section 100 in the three directions of X, Y, and Z or may be configured to move the stage 220 in the X direction and the Y direction and move the ejecting section 100 in the Z direction.

The cleaning mechanism 250 includes a brush 251 and a blade 252 for cleaning the nozzle 60. The cleaning mechanism 250 is disposed in a region different from the stage 220 in the horizontal direction. The cleaning mechanism 250 is disposed, in the vertical direction, at height where the brush 251 and the blade 252 can come into contact with the nozzle 60. In this embodiment, the cleaning mechanism 250 is connected to the housing 110 via a supporting section 280. A purge waste material container 260 is provided below the cleaning mechanism 250. A waste material removed by the cleaning mechanism 250 drops to and is collected in the purge waste material container 260. The blade 252 is called flicker plate as well. The cleaning mechanism 250 is called chip wipe assembly as well.

The control section 300 is configured by a computer including one or more processors 310, a storing section 320 including a main storage device and an auxiliary storage device, and an input and output interface that inputs and outputs signals from and to the outside. In this embodiment, the processor 310 executes a program stored in the storing section 320, whereby the control section 300 is capable of controlling, based on shaping data for shaping a three-dimensional shaped object, the ejecting section 100 and the driving section 210 to execute three-dimensional shaping processing explained below and cleaning processing for cleaning a nozzle. The control section 300 may be configured not by the computer but by a combination of a plurality of circuits.

The display device 400 is connected to the control section 300. The display device 400 is configured by, for example, a liquid crystal display or an organic EL display. In this embodiment, the display device 400 is provided in the housing 110. However, the display device 400 may be disposed separately from the housing 110.

Figure 2:
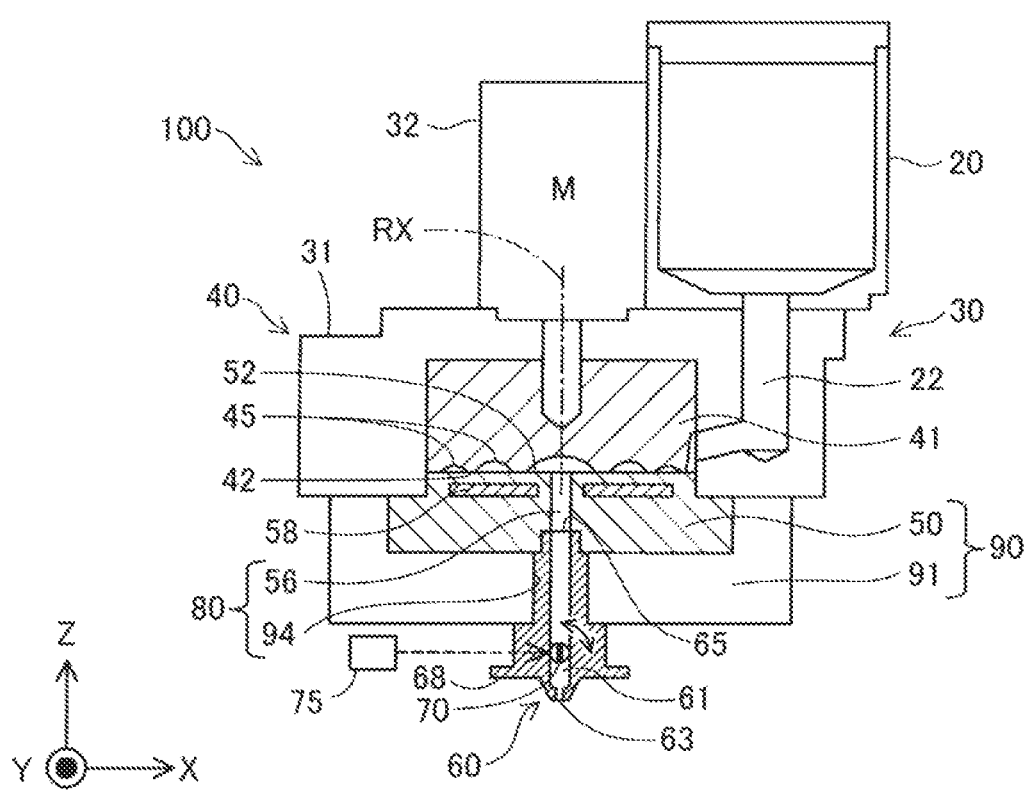
FIG. 2 is a diagram showing a schematic configuration of an ejecting section.

FIG. 2 is a diagram showing a schematic configuration of the ejecting section 100. The ejecting section 100 includes the plasticizing mechanism 30, the nozzle 60, and a flow-rate adjusting section 70. The plasticizing mechanism 30 includes a material conveying mechanism 40 and a heating block 90. A material stored in the material storing section 20 is supplied to the ejecting section 100. Under the control by the control section 300, the ejecting section 100 plasticizes, with the plasticizing mechanism 30, at least a part of the material supplied from the material storing section 20 to generate a shaping material and ejects the generated shaping material from the nozzle 60 onto the stage 220 and stacks the shaping material on the stage 220. The material stacked on the stage 220 is sometimes called stacked material. A method of three-dimensional shaping for ejecting the material from the nozzle 60 and stacking the ejected material to thereby shape a three-dimensional shaped object is sometimes called material extrusion (ME).

In this embodiment, "plasticization" is a concept including melting and means changing the material from a solid to a state having fluidity. Specifically, in the case of a material in which glass transfer occurs, the plasticization means setting the temperature of the material to a glass transfer point or higher. In the case of a material in which glass transfer does not occur, the plasticization means setting the temperature of the material to a melting point or higher.

A pellet or a material in a state of powder or the like is stored in the material storing section 20 in this embodiment. In this embodiment, the material stored in the material storing section 20 is pellet-like resin. The material storing section 20 in this embodiment is configured by a hopper. The material stored in the material storing section 20 is supplied to the material conveying mechanism 40 of the plasticizing mechanism 30 via a supply path 22 provided below the material storing section 20 to connect the material storing section 20 and the ejecting section 100.

The heating block 90 includes a heater 58. The heater 58 is controlled by the control section 300 and heated to a plasticizing temperature for plasticizing the material. The plasticizing temperature is different depending on a type of a material in use and is, for example, a glass transfer point or a melting point of the material. If the material is ABS resin, the plasticizing temperature is set to, for example, approximately 110° C., which is a glass transfer point of the ABS resin. A through-hole 80 is provided in the heating block 90. The through-hole 80 is configured such that the nozzle 60 can be attached to and detached from the through-hole 80. The material conveying mechanism 40 conveys the shaping material toward a nozzle channel 61 of the nozzle 60 attached to the through-hole 80 of the heating block 90. The plasticizing mechanism 30 plasticizes the material supplied from the material storing section 20 to the material conveying mechanism 40 while conveying the material toward the nozzle channel 61 of the nozzle 60 with the material conveying mechanism 40 and heating the material with the heat of the heating block 90.

The material conveying mechanism 40 in this embodiment includes a screw case 31, a screw 41 housed in the screw case 31, and a driving motor 32 that drives the screw 41. The heating block 90 in this embodiment includes a case 91 including an opening 94 and a barrel 50 disposed in the case 91. A communication hole 56 is provided in the barrel 50. The opening 94 and the communication hole 56 communicate, whereby the through-hole 80 in this embodiment is formed. The heater 58 is incorporated in the barrel 50. The screw 41 in this embodiment is a so-called flat screw and is sometimes called "scroll" as well.

The screw 41 has a substantially columnar shape, the height of which in a direction along a center axis RX thereof is smaller than the diameter thereof. The screw 41 includes, on a surface opposed to the barrel 50, a groove forming surface 42 on which screw grooves 45 are formed. The groove forming surface 42 is opposed to a screw counter surface 52 of the barrel 50 explained below. The center axis RX in this embodiment coincides with a rotation axis of the screw 41. Details of the configuration of the screw 41 are explained below.

The driving motor 32 is coupled to the surface on the opposite side of the groove forming surface 42 of the screw 41. The driving motor 32 is driven under the control by the control section 300. The screw 41 rotates centering on the center axis RX with torque generated by the rotation of the driving motor 32. The driving motor 32 may be directly coupled to the screw 41 or may be coupled to the screw 41 via, for example, a speed reducer.

The barrel 50 includes a screw counter surface 52 opposed to the groove forming surface 42 of the screw 41. The case 91 is disposed to cover the surface on the opposite side of the screw counter surface 52 of the barrel 50, that is, the lower surface of the barrel 50. The communication hole 56 and the opening 94 are provided in a position overlapping the center axis RX of the screw 41. That is, the through-hole 80 is located in a position overlapping the center axis RX.

As explained above, the nozzle 60 is detachably attached to the through-hole 80 of the heating block 90. The nozzle 60 is called nozzle chip as well. The nozzle channel 61 is provided in the nozzle 60. The nozzle channel 61 includes a nozzle opening 63 at the distal end of the nozzle 60 and includes an inflow port 65 at the rear end of the nozzle 60. The nozzle opening 63 is located in a position in the −Z direction of the inflow port 65. The nozzle 60 in this embodiment ejects, from the nozzle opening 63, toward the stage 220, the material flowing into the nozzle channel 61 via the through-hole 80 and the inflow port 65. A heater for heating the material in the nozzle channel 61 may be provided around the nozzle channel 61.

The nozzle 60 includes a shield 68 above the distal end of the nozzle 60. More specifically, the shield 68 is disposed between the nozzle opening 63 and the heating block 90 in the outer circumference of the nozzle 60. The shield 68 has a disc shape in the horizontal direction. The shield 68 prevents the heat of the heating block 90 from being transferred to the stacked material.

The flow-rate adjusting section 70 rotates in the nozzle channel 61 to thereby change an opening degree of the nozzle channel 61. In this embodiment, the flow-rate adjusting section 70 is configured by a butterfly valve. The flow-rate adjusting section 70 is driven by the valve driving section 75 under the control by the control section 300. The valve driving section 75 is configured by, for example, a stepping motor. The control section 300 can adjust a flow rate of the shaping material flowing from the material conveying mechanism 40 to the nozzle 60, that is, a flow rate of the shaping material ejected from the nozzle 60 by controlling a rotation angle of the butterfly valve using the valve driving section 75. The flow-rage adjusting section 70 not only can adjust the flow rate of the shaping material but also can control ON/OFF of an outflow of the shaping material.

Figure 3:
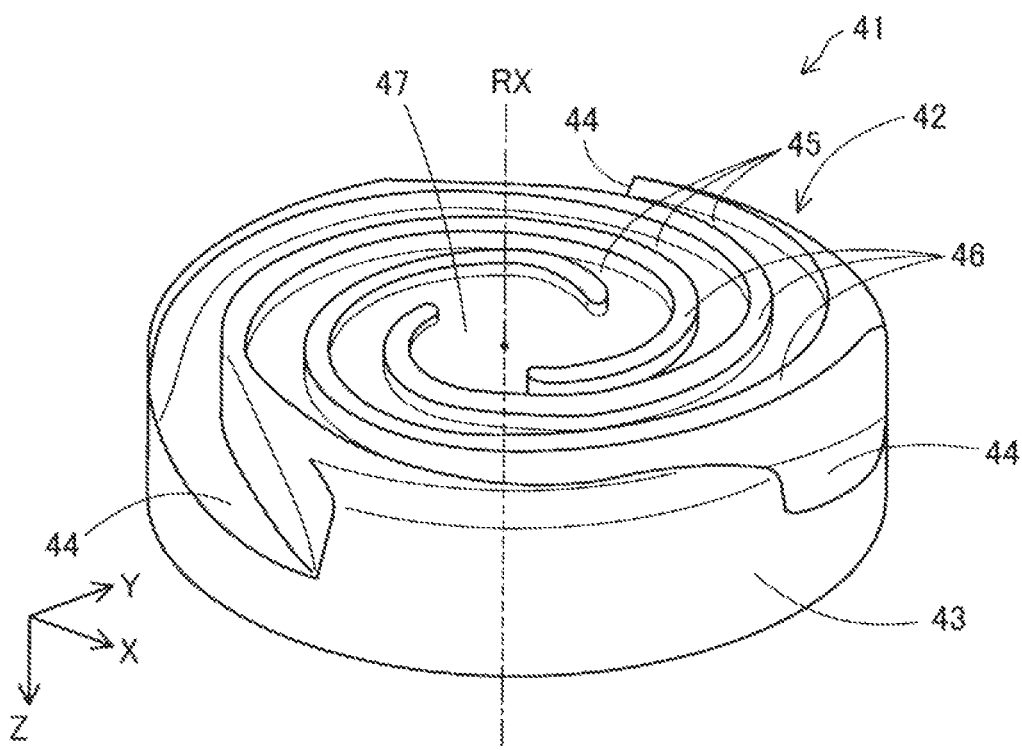
FIG. 3 is a schematic perspective view showing the configuration of a screw.

FIG. 3 is a schematic perspective view showing the configuration on the groove forming surface 42 side of the screw 41. In FIG. 3, the position of the center axis RX of the screw 41 is indicated by an alternate long and short dash line. As explained above, the screw grooves 45 are provided on the groove forming surface 42. A screw center 47, which is the center of the groove forming surface 42 of the screw 41, is configured as a recess to which one ends of the screw grooves 45 are coupled. The screw center 47 is opposed to the communication hole 56 of the barrel 50. The screw center 47 crosses the center axis RX.

The screw grooves 45 of the screw 41 configure so-called scroll grooves. The screw grooves 45 extend from the screw center 47 toward the outer circumference of the screw 41 to draw an arc. The screw grooves 45 may be configured to extend in an involute curve shape or a spiral shape. Convex ridges 46 configuring sidewalls of the screw grooves 45 and extending along the screw grooves 45 are provided on the groove forming surface 42. The screw grooves 45 are continuous to material introducing ports 44 formed on a side surface 43 of the screw 41. The material introducing ports 44 are portions that receive the material supplied via the supply path 22 of the material storing section 20.

In FIG. 3, an example of the screw 41 including three screw grooves 45 and three convex ridges 46 is shown. The number of the screw grooves 45 and the convex ridges 46 provided in the screw 41 is not limited to three. Only one screw groove 45 may be provided or two or more screw grooves 45 may be provided. In FIG. 3, an example of the screw 41 in which the material introducing ports 44 are formed in three places is shown. The number of the material introducing ports 44 provided in the screw 41 is not limited to three. The material introducing port 44 may be provided only in one place or the material introducing ports 44 may be provided in two or more places.

Figure 4:
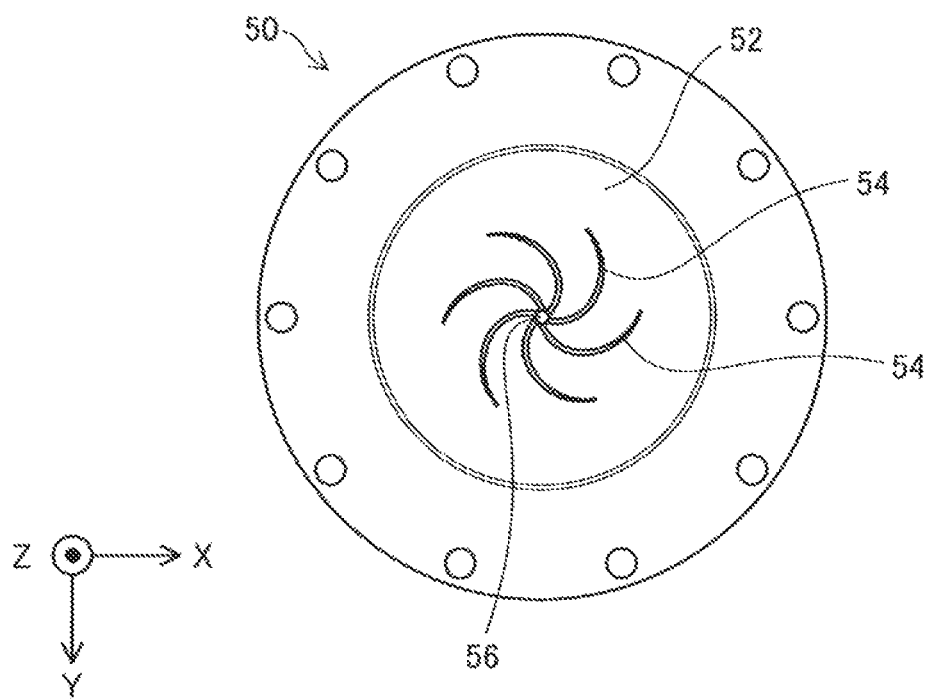
FIG. 4 is a top view showing the configuration of a barrel.

FIG. 4 is a top view showing the configuration on the screw counter surface 52 side of the barrel 50. As explained above, the communication hole 56 is formed in the center of the screw counter surface 52. A plurality of guide grooves 54 are formed around the communication hole 56 on the screw counter surface 52. Each of the guide grooves 54 is coupled to the communication hole 56 at one end and spirally extends from the communication hole 56 toward the outer circumference of the screw counter surface 52. Each of the guide grooves 54 has a function of guiding the shaping material to the communication hole 56. The one end of the guide groove 54 may not be coupled to the communication hole 56. The guide grooves 54 may not be formed in the barrel 50.

Figure 5:
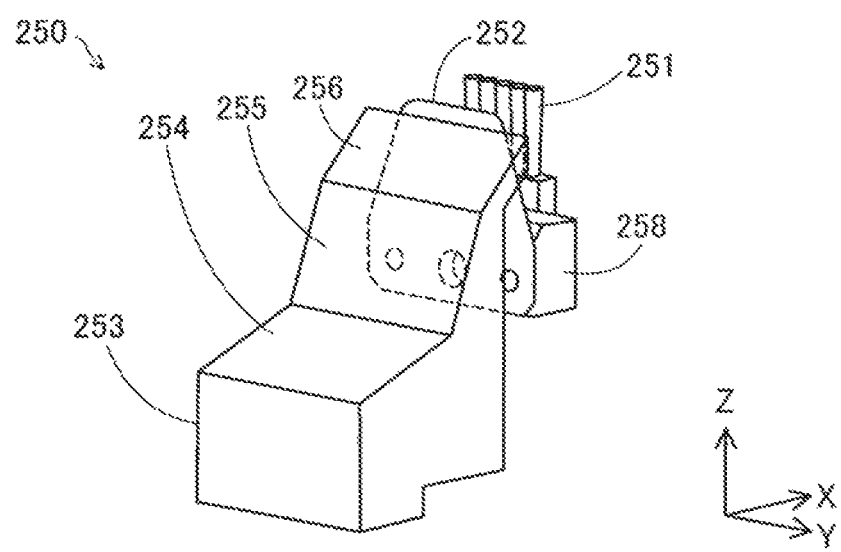
FIG. 5 is an explanatory diagram showing a schematic configuration of a cleaning mechanism.

FIG. 5 is an explanatory diagram showing a schematic configuration of the cleaning mechanism 250. As explained above, the cleaning mechanism 250 includes the brush 251 and the blade 252. The brush 251 is configured by arranging a plurality of hair bundles in the Y direction. The blade 252 is a flat member extending in the Z direction and the Y direction. The distal end of the brush 251 and the distal end of the blade 252 face the +Z direction. The distal end of the blade 252 is disposed below the distal end of the brush 251. As explained above, the brush 251 and the blade 252 are disposed at the height where the brush 251 and the blade 252 can come into contact with the nozzle 60. The distal end of the brush 251 is disposed at height where the distal end of the brush 251 can come into contact with the shield 68 provided in the nozzle 60. The distal end of the blade 252 is disposed at height where the distal end of the blade 252 does not come into contact with the shield 68. In this embodiment, the brush 251 and the blade 252 are integrated by a fixture 258 and can be simultaneously replaced when being worn. The brush 251 and the blade 252 can be individually replaced.

The brush 251 and the blade 252 have a melting point higher than a plasticizing temperature of the plasticizing material plasticized in the ejecting section 100. The brush 251 and the blade 252 have hardness lower than the hardness of the nozzle 60. In this embodiment, the hardness means Vickers hardness. Further, in this embodiment, a modulus of elasticity of the blade 252 is higher than a modulus of elasticity of the brush 251. In this embodiment, the modulus of elasticity means a Young's modulus. The nozzle 60 is formed by metal such as an ultrahard alloy, tool steel, or SUS. The brush 251 and the blade 252 are formed by metal such as SUS, iron, or brass. The brush 251 and the blade 252 may be respectively formed by resin. The brush 251 may be formed by a natural fiber or a chemical fiber. The blade 252 may be formed by ceramic. In the other embodiments, the moduli of elasticity of the blade 252 and the brush 251 may be the same. The modulus of elasticity of the brush 251 may be higher than the modulus of elasticity of the blade 252.

The cleaning mechanism 250 further includes a purge section 253. The purge section 253 is called purge ledge as well. In this embodiment, the purge section 253, the blade 252, and the brush 251 are arranged in a +X direction in this order. That is, the blade 252 is disposed between the purge section 253 and the brush 251. The distal end in the +Z direction of the purge section 253 is lower than the distal end of the blade 252. In cleaning processing explained below, a waste material ejected from the nozzle 60 drops and is collected in a spherical shape on the purge section 253 and drops to the purge waste material container 260. The upper surface of the purge section 253 is configured as an inclined surface in order to accelerate the drop of the waste material. More specifically, the purge section 253 includes a first inclined surface 254, a second inclined surface 255, and a third inclined surface 256 in descending order of distances from the blade 252 and in ascending order of heights of positions in the vertical direction. The first inclined surface 254, the second inclined surface 255, and the third inclined surface 256 are respectively inclined such that the positions of the ends in the +X direction thereof are higher than the positions of the ends in a −X direction thereof. In this embodiment, inclination angles from the horizontal plane of the second inclined surface 255 and the third inclined surface 256 are larger than an inclination angle from the horizontal plane of the first inclined surface 254.

Figure 6:
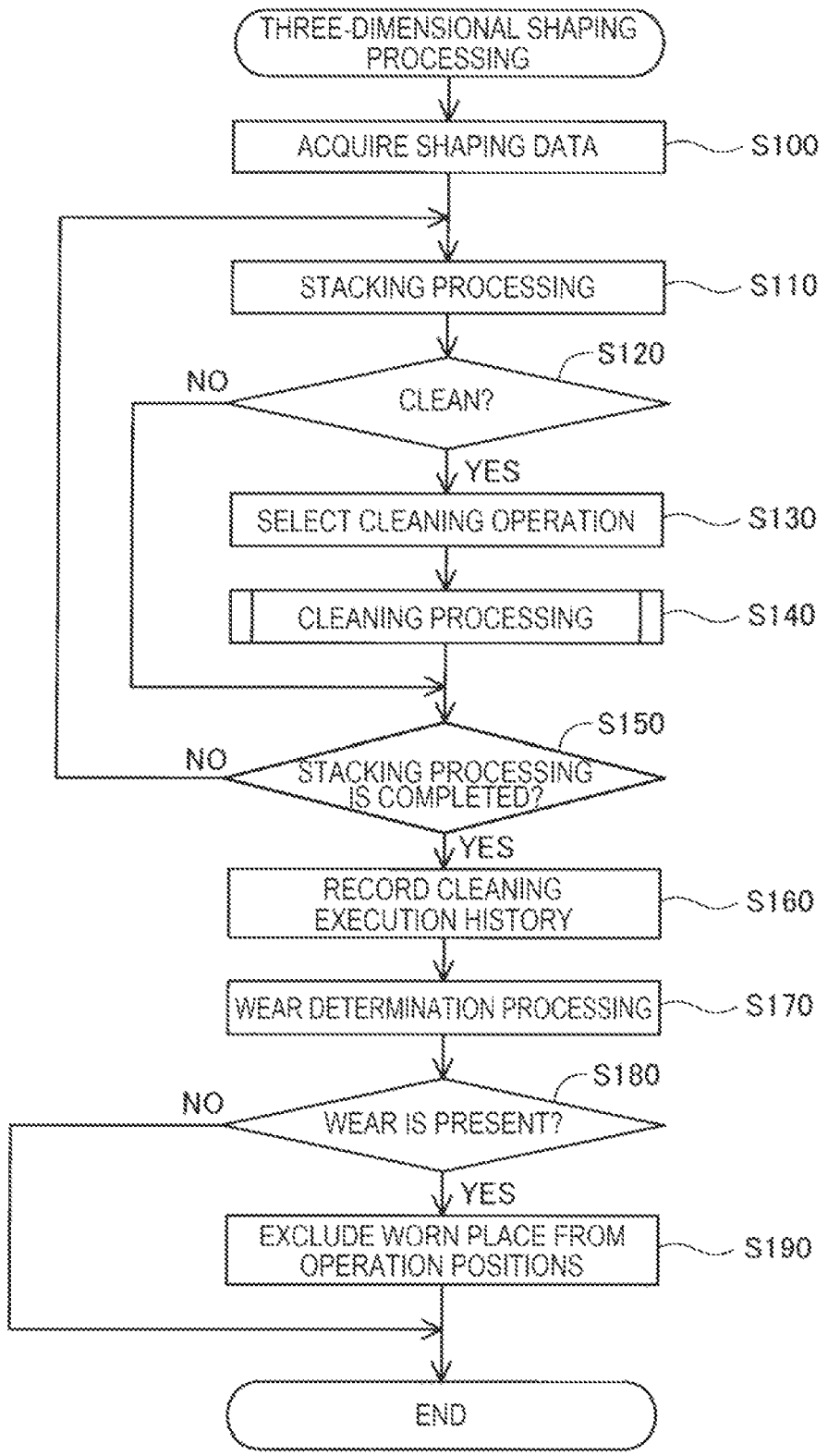
FIG. 6 is a flowchart of three-dimensional shaping processing.

FIG. 6 is a flow chart of three-dimensional shaping processing showing a manufacturing method for a three-dimensional shaped object. The three-dimensional shaping processing is executed when the control section 300 of the three-dimensional shaping apparatus 10 receives predetermined operation from the user.

In step S100, the control section 300 acquires shaping data from a computer, a recording medium, or the like on the outside. The shaping data includes, for each of layers forming the three-dimensional shaped object, shaping path data representing a moving path of the nozzle 60. Ejection amount data representing an ejection amount of the material ejected from the nozzle 60 is correlated with the shaping path data.

Subsequently, in step S110, the control section 300 starts execution of stacking processing. The stacking processing is processing for controlling the driving section 210 and the ejecting section 100 according to the shaping data and causing the ejecting section 100 to eject the shaping material onto the stage 220 to thereby shape a three-dimensional shaped object including a plurality of layers. Step S110 is referred to as stacking step as well.

During the execution of the stacking processing, in step S120, the control section 300 determines whether to execute cleaning processing. For example, the control section 300 determines to execute the cleaning processing, for example, when an ejection abnormality of the shaping material is detected in the plasticizing mechanism 30, when a predetermined number of layers are formed, when a type of the shaping material is changed, or when a command for designating cleaning included in the shaping data is received. When determining to execute the cleaning processing, the control section 300 controls the flow-rate adjusting section 70, temporarily stops the ejection of the shaping material from the nozzle 60, and, in step S130, performs processing for selecting a cleaning operation for the nozzle 60 in the cleaning processing. Specifically, in step S130, the control section 300 selects one cleaning operation among a plurality of cleaning operations in which tracks for moving the nozzle 60 are different. In this embodiment, in the plurality of cleaning operations in which the tracks are different, contact start positions of the nozzle 60 and the cleaning mechanism 250 are respectively different.

Figure 7:
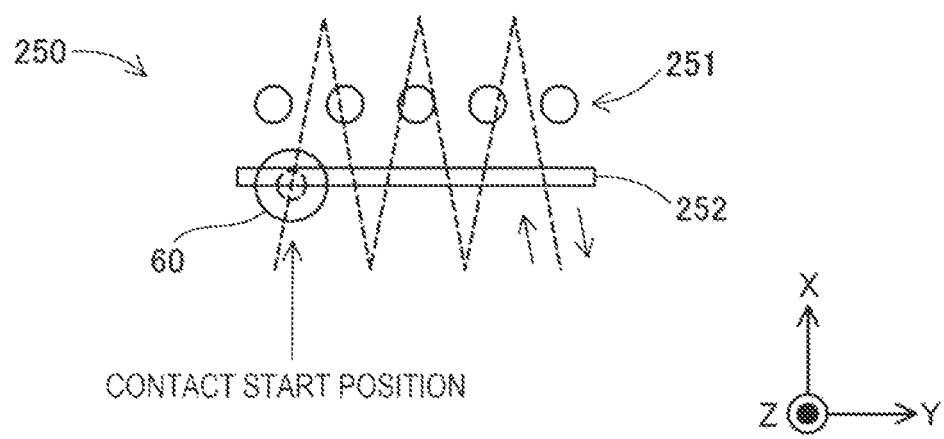
FIG. 7 is an explanatory diagram of a cleaning operation.

FIG. 7 is an explanatory diagram of the cleaning operation in this embodiment. In FIG. 7, a state in which the distal end of the nozzle 60 and the brush 251 and the blade 252 of the cleaning mechanism 250 are viewed from above is shown. A moving track of the nozzle 60 is indicated by a broken line. As shown in FIG. 7, the cleaning mechanism 250 has a longitudinal direction. In this embodiment, the longitudinal direction in the Y direction. In this embodiment, in the cleaning operation, after bringing the distal end of the nozzle 60 into contact with the blade 252, the control section 300 brings the distal end of the nozzle 60 into contact with the brush 251. Thereafter, the control section 300 causes the nozzle 60 to reciprocate to traverse the brush 251 and the blade 252 a plurality of times. Specifically, in this embodiment, the control section 300 moves, from a contact start position where the nozzle 60 and the cleaning mechanism 250 come into contact first, the nozzle 60 in the longitudinal direction of the cleaning mechanism 250 following an M-shaped or W-shaped track, in other words, a track showing a triangular wave shape. Consequently, in the cleaning operation, the control section 300 can cause the nozzle 60 to reciprocate in the X direction such that the nozzle 60 comes into contact with the brush 251 or the blade 252 in a different position of the brush 251 or the blade 252 every time the nozzle 60 passes the brush 251 or the blade 252. In this embodiment, the control section 300 starts the movement of the nozzle 60 in the contact start position and moves the nozzle 60 such that the nozzle 60 returns to the contact start position again. In this embodiment, in the cleaning operation, the control section 300 brings the nozzle 60 into contact with both of the brush 251 and the blade 252. However, the control section 300 may bring the nozzle 60 into contact with one of the brush 251 and the blade 252.

Figure 8:
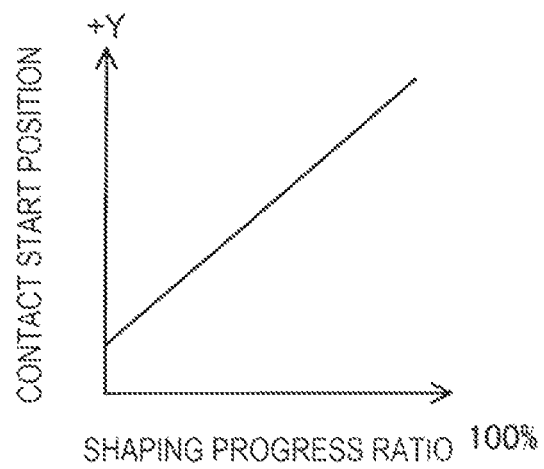
FIG. 8 is a diagram showing a relation between a contact start position and a shaping progress ratio.

FIG. 8 is a diagram showing a relation between the contact start position and a shaping progress ratio. In this embodiment, in step S130 explained above, the control section 300 determines the contact start position according to a present shaping progress ratio. The shaping progress ratio means a ratio of the number of layers stacked to the present to the number of all layers configuring the three-dimensional shaped object. For example, when the three-dimensional shaped object is configured by ten layers, the shaping progress ratio is 40% if the number of layers stacked to the present is four. In this way, in this embodiment, a plurality of cleaning operations having contact start positions corresponding to shaping progress ratios are prepared. The control section 300 selects a cleaning operation corresponding to the present shaping progress ratio out of the plurality of cleaning operations and executes the cleaning operation. The control section 300 moves the nozzle 60 from the determined contact start position to reciprocate once in the longitudinal direction of the cleaning mechanism 250 while following the track shown in FIG. 7. For example, when the contact start position is not the end in the longitudinal direction of the cleaning mechanism 250, the control section 300 moves the nozzle 60 from the contact start position in a +Y direction following the track shown in FIG. 7, after the nozzle 60 reaches the end in the +Y direction, moves the nozzle 60 in a −Y direction, and, after the nozzle 60 reaches the end in the −Y direction, moves the nozzle 60 to the contact start position again. Besides, the control section 300 may move the nozzle 60 in a predetermined distance in the longitudinal direction of the cleaning mechanism 250. In the other embodiments, the contact start position may be determined according to not the shaping progress ratio but a time from a shaping start, an amount of the material discharged to that point, the length of a path shaped to that point, or the like.

After selecting the cleaning operation in step S130 in FIG. 6, the control section 300 executes cleaning processing in step S140. Step S140 is referred to as cleaning step as well.

Figure 9:
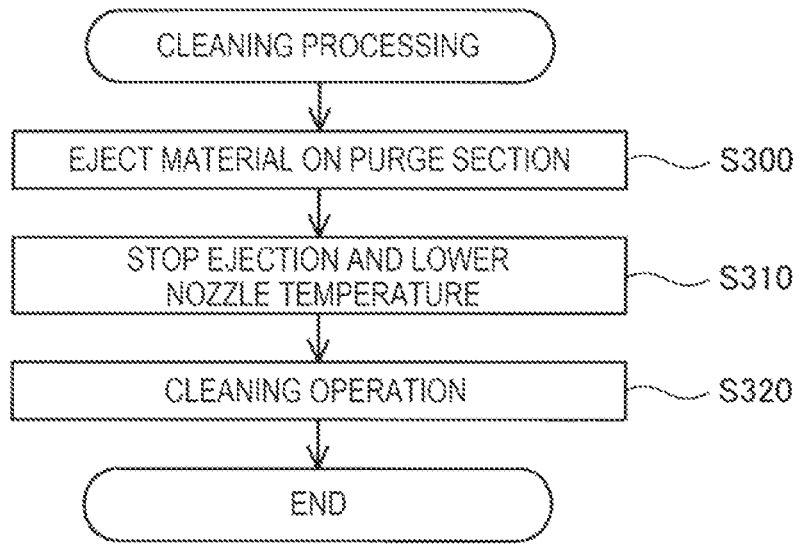
FIG. 9 is a detailed flowchart of cleaning processing.

FIG. 9 is a detailed flowchart of the cleaning processing. When the cleaning processing is executed, in step S300, the control section 300 controls the driving section 210 and moves the nozzle 60 onto the purge section 253 and, thereafter, controls the flow-rate adjusting section 70 and causes the nozzle 60 to eject a predetermined amount of the material toward the purge section 253. The material ejected toward the purge section 253 is referred to as waste material as well. The waste material ejected to the purge section 253 drops to the purge waste material container 260 along the inclined surface on the purge section 253. An amount of the ejected material is, for example, an amount equivalent to the volume of the nozzle channel 61.

In step S310, the control section 300 controls the flow-rate adjusting section 70 and stops the ejection of the waste material from the nozzle 60. When the ejection of the waste material is stopped, since a melted material does not flow to the nozzle 60, the temperature of the nozzle 60 drops. When a heater is provided in the nozzle 60, the control section 300 may stop the heater included in the nozzle 60 from step S310 until the cleaning operation in step S320 explained below ends. When a cooling section is included in the nozzle 60, the control section 300 may cause the cooling section included in the nozzle 60 to operate from step S310 until the cleaning operation in step S320 explained below ends.

In step S320, the control section 300 executes the cleaning operation selected in step S130 in a state in which the temperature of the nozzle 60 is lower than the temperature of the nozzle 60 at the stacking processing time.

Referring back to FIG. 6, when the cleaning processing in step S140 ends or when determining in step S120 not to execute the cleaning processing, in step S150, the control section 300 determines whether the stacking processing is completed for all the layers, that is, the shaping of the three-dimensional shaped object is completed. If the stacking processing is not completed, the control section 300 returns the processing to step S110 and subsequently continues the stacking processing. If the stacking processing is completed, in step S160, the control section 300 causes the storing section 320 to store an execution history of the cleaning processing.

Figure 10:
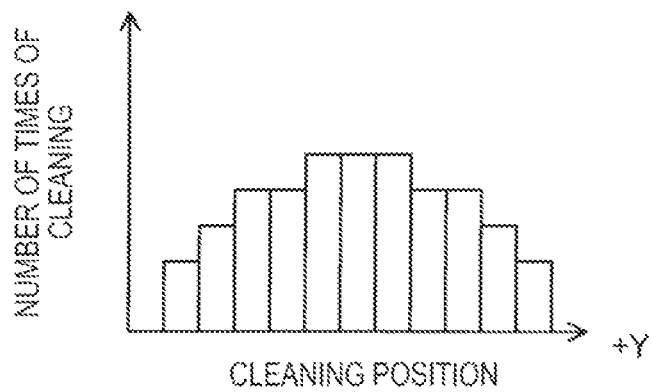
FIG. 10 is a diagram showing an example of an execution history of the cleaning processing.

FIG. 10 is a diagram showing an example of the execution history of the cleaning processing. In this embodiment, the control section 300 counts, for each position in the longitudinal direction of the cleaning mechanism 250, the number of times the position is cleaned, that is, the number of times the nozzle 60 passes the position, and records a distribution of the number of times in the storing section 320 as the execution history of the cleaning processing. The execution history is reset when the cleaning mechanism 250 is replaced with a new cleaning mechanism 250. The control section 300 may detect the replacement of the cleaning mechanism 250 with a sensor or the like or may detect the replacement of the cleaning mechanism 250 by receiving predetermined operation from the user.

In step S170 in FIG. 6, the control section 300 executes wear determination processing for determining a worn state of the cleaning mechanism 250. In the wear determination processing, the control section 300 refers to the execution history of the cleaning processing stored in the storing section 320 and, when detecting that a cleaning position where the number of times of cleaning exceeds a predetermined number of times of cleaning is present in one or more places, determines that wear is present. When determining in step S180 that wear is present, in step S190, the control section 300 controls next and subsequent cleaning operations not to cause the nozzle 60 to pass, in the next and subsequent cleaning operations, a worn place, that is, the cleaning position where it is determined that the wear is present. That is, the control section 300 excludes the worn place from target positions of the cleaning operation. In the other embodiments, for example, in the next and subsequent cleaning operations, when the nozzle 60 passes the worn place, the control section 300 may clean the nozzle 60 using a worn portion as well by further moving the nozzle 60 in the −Z direction in a place where the wear further worsens. When the wear worsens to a certain degree, the control section 300 may perform display for urging replacement of the cleaning mechanism 250 on the display device 400. When determining in step S180 that wear is absent, the control section 300 may skip the processing in step S190.

The three-dimensional shaping apparatus 10 in this embodiment explained above causes the nozzle 60 to reciprocate such that, in the cleaning operation, the nozzle 60 comes into contact with the brush 251 or the blade 252 in different positions of the brush 251 or the blade 252 and sets the temperature of the nozzle 60 in the cleaning operation lower than the temperature of the nozzle 60 at the layer stacking time. Accordingly, a waste material is prevented from collectively adhering to a specific place of the cleaning mechanism 250. The waste material adhering to the cleaning mechanism 250 is prevented from being heated by contact with the nozzle 60 to be softened. As a result, it is possible to prevent the waste material adhering to the cleaning mechanism 250 from adhering to the nozzle 60 again. Consequently, it is possible to prevent the waste material adhering to the cleaning mechanism 250 from affecting shaping accuracy.

In this embodiment, in the cleaning processing, the selected cleaning operation among the plurality of cleaning operations in which the tracks for moving the nozzle 60 are different is executed. Therefore, it is possible to properly use the plurality of cleaning operations in which the tracks for moving the nozzle 60 are different and clean the nozzle 60. In particular, in this embodiment, in the plurality of cleaning operations in which the tracks are different, contact start positions of the nozzle 60 and the cleaning mechanism 250 are respectively different. Therefore, it is possible to effectively prevent the waste material from adhering to a specific position of the cleaning mechanism 250. Consequently, it is possible to effectively prevent the waste material adhering to the cleaning mechanism 250 from adhering to the nozzle 60 again.

In this embodiment, the contact start position in the cleaning operation is changed according to the shaping progress ratio. Therefore, every time the cleaning operation is executed, the cleaning operation different from the cleaning operation executed last time is executed. Accordingly, it is possible to effectively prevent the waste material from adhering to a specific position of the cleaning mechanism 250. Consequently, it is possible to more effectively prevent the waste material adhering to the cleaning mechanism 250 from adhering to the nozzle 60 again.

In this embodiment, the control section 300 causes the storing section 320 to store the execution history of the cleaning processing. Accordingly, the control section 300 can check a worn state of the cleaning mechanism 250 using the execution history. As a result, it is possible to cause the nozzle 60 to perform the cleaning operation to exclude a worn place of the cleaning mechanism 250. It is possible to prevent the movement of the nozzle 60 to bring the nozzle 60 into contact with the worn place.

In this embodiment, the modulus of elasticity of the blade 252 included in the cleaning mechanism 250 is higher than the modulus of elasticity of the brush 251. Accordingly, the material adhering to the nozzle 60 is easily removed by the blade 252.

In this embodiment, the distal end of the blade 252 is disposed below the distal end of the brush 251 in the cleaning mechanism 250. Therefore, the material adhering to the distal end of the nozzle 60 can be effectively removed by the blade 252.

In this embodiment, the distal end of the brush 251 is disposed at the height where the distal end of the brush 251 can come into contact with the shield 68 and the distal end of the blade 252 is disposed at the height where the distal end of the blade 252 does not come into contact with the shield 68. Therefore, the material adhering to the shield 68 can be removed by the brush 251.

In this embodiment, in the cleaning operation, the control section 300 brings the distal end of the nozzle 60 into contact with the blade 252 and removes the shaping material adhering to the distal end of the nozzle 60 and, thereafter, brings the distal end of the nozzle 60 into contact with the brush 251. Therefore, the nozzle 60 can be efficiently cleaned.

In this embodiment, in the cleaning processing, the control section 300 causes the nozzle 60 to eject the waste material on the purge section 253 and, thereafter, moves the nozzle 60 toward the brush 251 and the blade 252. Therefore, it is possible to clean the nozzle 60 after removing the shaping material remaining in the nozzle channel 61.

In this embodiment, during the shaping of the three-dimensional shaped object, the stacking processing and the cleaning processing are repeatedly executed. However, the cleaning processing may be executed not only during the shaping but also before the shaping of the three-dimensional shaped object is started or after the shaping of the three-dimensional shaped object is completed.

Figure 11:
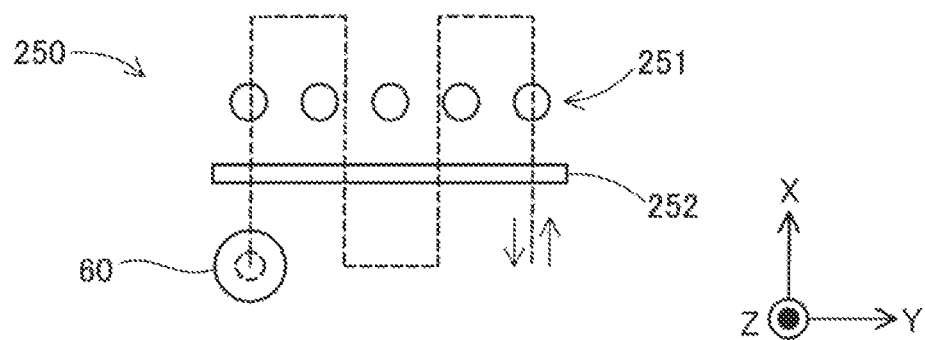
FIG. 11 is an explanatory diagram of another example of the cleaning operation.
Figure 12:
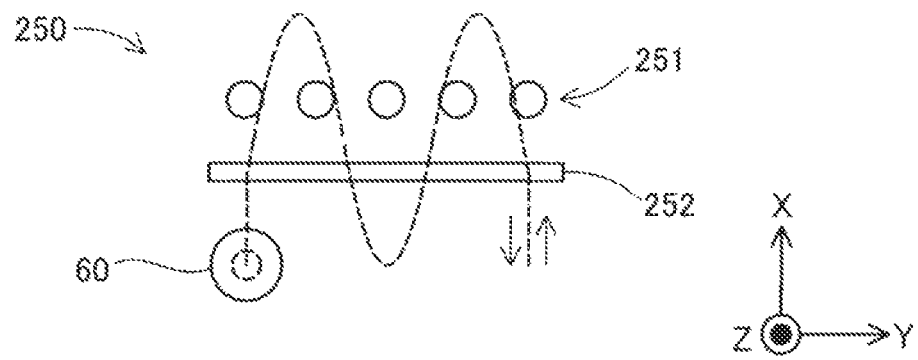
FIG. 12 is an explanatory diagram of another example of the cleaning operation.
Figure 13:
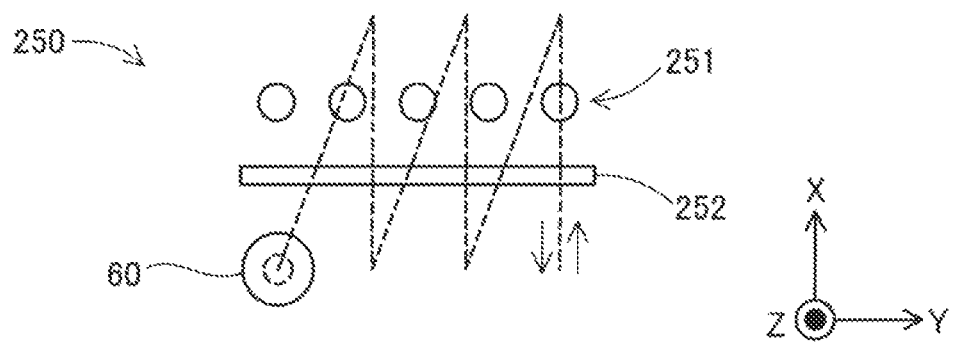
FIG. 13 is an explanatory diagram of another example of the cleaning operation.
Figure 14:
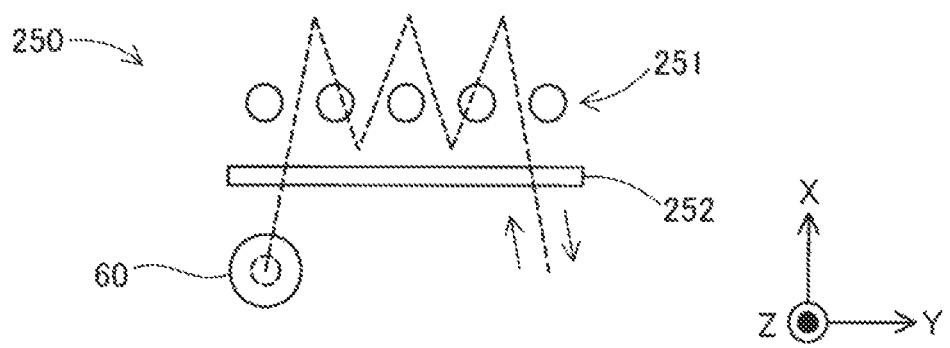
FIG. 14 is an explanatory diagram of another example of the cleaning operation.

FIGS. 11 to 14 are explanatory diagrams of other examples of the cleaning operation. In FIG. 11, an example is shown in which the nozzle 60 is moved in the longitudinal direction of the cleaning mechanism 250 following a track showing a rectangular wave shape. In FIG. 12, an example is shown in which the nozzle 60 is moved in the longitudinal direction of the cleaning mechanism 250 following a track showing a sine wave shape. In FIG. 13, an example is shown in which the nozzle 60 is moved in the longitudinal direction of the cleaning mechanism 250 following a track showing a sawtooth wave shape. As shown in these figures, in the cleaning operation, the control section 300 is capable of causing the nozzle 60 to reciprocate in various tracks. As shown in FIG. 14, in the cleaning operation, the control section 300 may set the number of times the nozzle 60 traverses the brush 251 larger than the number of times the nozzle 60 traversers the blade 252. Consequently, it is possible suppress wear of the blade 252.

B. Second Embodiment

Figure 15:
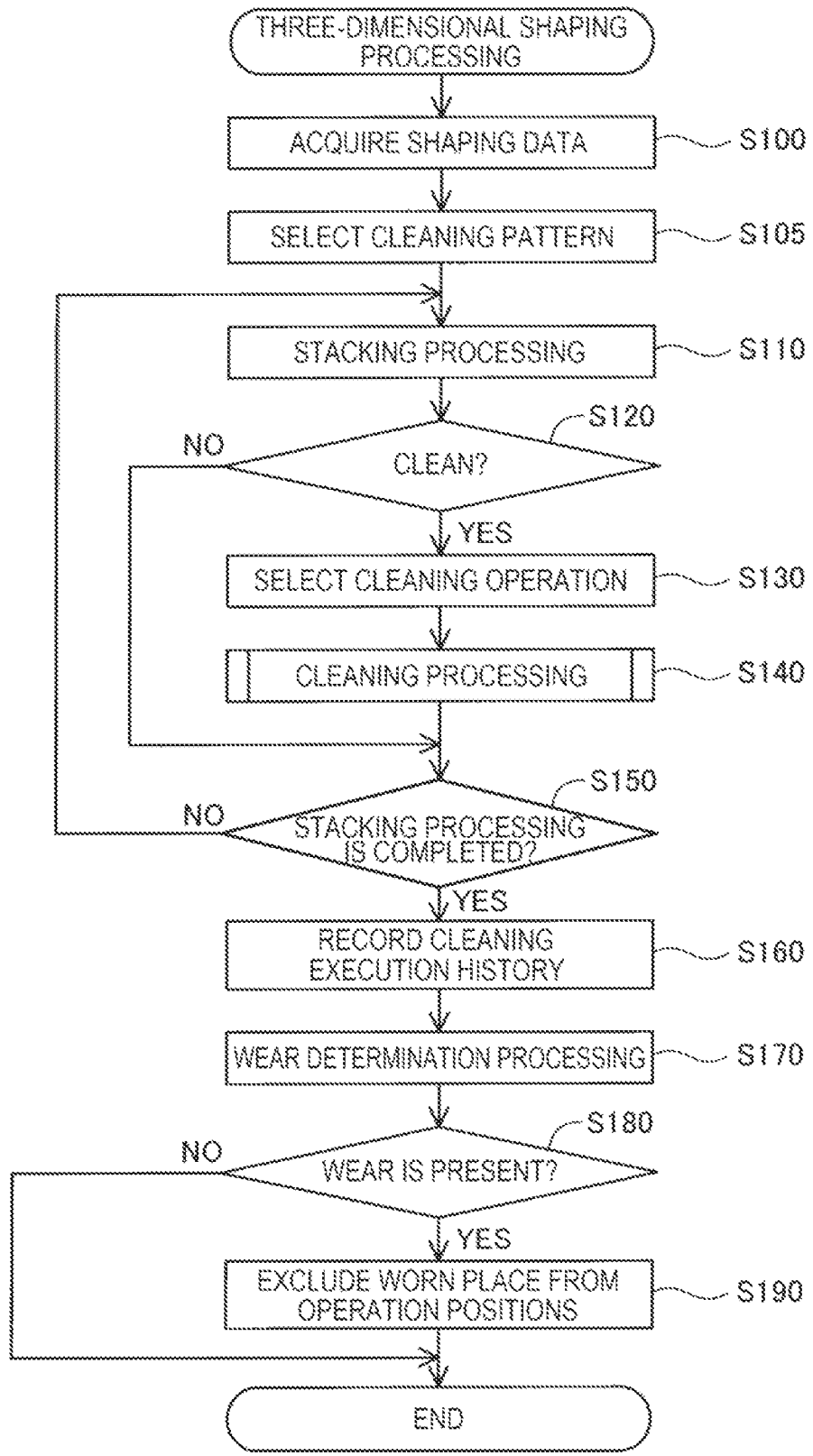
FIG. 15 is a flowchart of three-dimensional shaping processing in a second embodiment.

FIG. 15 is a flowchart of three-dimensional shaping processing in a second embodiment. The configuration of the three-dimensional shaping apparatus 10 in the second embodiment is the same as the configuration of the three-dimensional shaping apparatus 10 in the first embodiment.

As shown in FIG. 15, in the three-dimensional shaping processing in the second embodiment, after acquiring shaping data in step S100, in step S105, the control section 300 selects a cleaning pattern. The cleaning pattern includes a plurality of cleaning operations in which tracks are different. In this embodiment, a plurality of types of the cleaning patterns are stored in the storing section 320.

Figure 16:
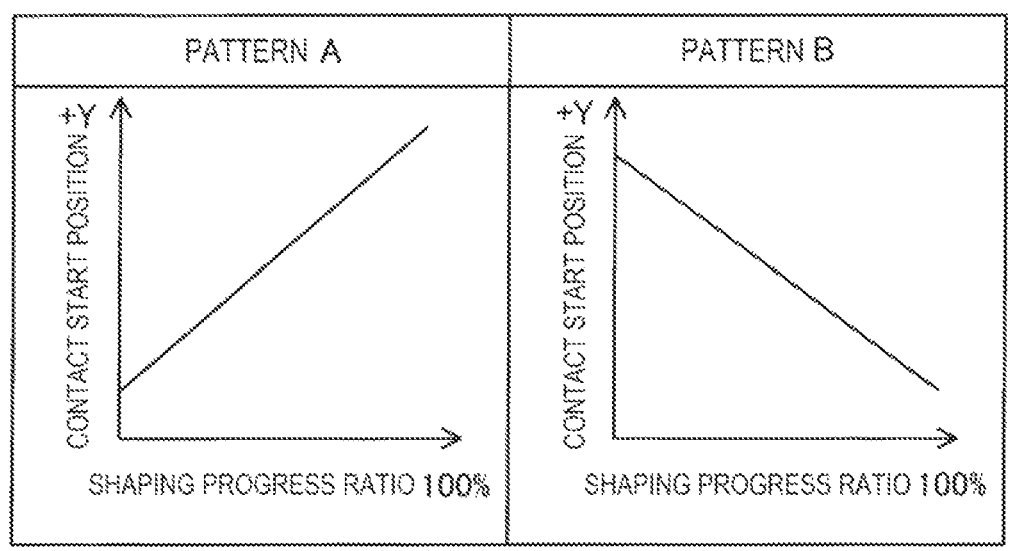
FIG. 16 is a diagram showing an example of a cleaning pattern.

FIG. 16 is a diagram showing an example of the cleaning patterns. In this embodiment, a pattern A and a pattern B are stored in the storing section 320 as the cleaning patterns. In the pattern A, a track of a cleaning operation is specified such that a contact start position at the cleaning operation time moves from the −Y direction to the +Y direction as a shaping progress ratio increases. In the pattern B, a track of a cleaning operation is specified such that a contact start position at the cleaning operation time moves from the +Y direction to the −Y direction as the shaping progress ratio increases. In step S105 explained above, the control section 300 alternately selects the pattern A and the pattern B every time the three-dimensional shaping processing is executed, that is, every time a three-dimensional shaped object is shaped.

In the three-dimensional shaping processing in the second embodiment, in step S130 in FIG. 15, the control section 300 selects a cleaning operation corresponding to a shaping progress ratio using the cleaning pattern selected in step S105 and executes the cleaning operation in the cleaning processing in step S140. Processing in steps S110 to S120 and S150 to S190 has the same processing content as the processing content of the three-dimensional shaping processing in the first embodiment. Therefore, explanation of the processing is omitted.

According to the second embodiment explained above, a plurality of types of cleaning patterns including a plurality of cleaning operations in which tracks are different are stored in the storing section 320. Every time a three-dimensional shaped object is shaped, the control section 300 executes the cleaning processing using a cleaning pattern selected out of the plurality of types of cleaning patterns. Accordingly, it is possible to effectively prevent a waste material from adhering to a specific position of the cleaning mechanism 250. Consequently, it is possible to prevent the waste material adhering to the cleaning mechanism 250 from adhering to the nozzle 60 again. In this embodiment, the two types of cleaning patterns are described. However, three or more types of cleaning patterns may be stored in the storing section 320.

C. Third Embodiment

Figure 17:
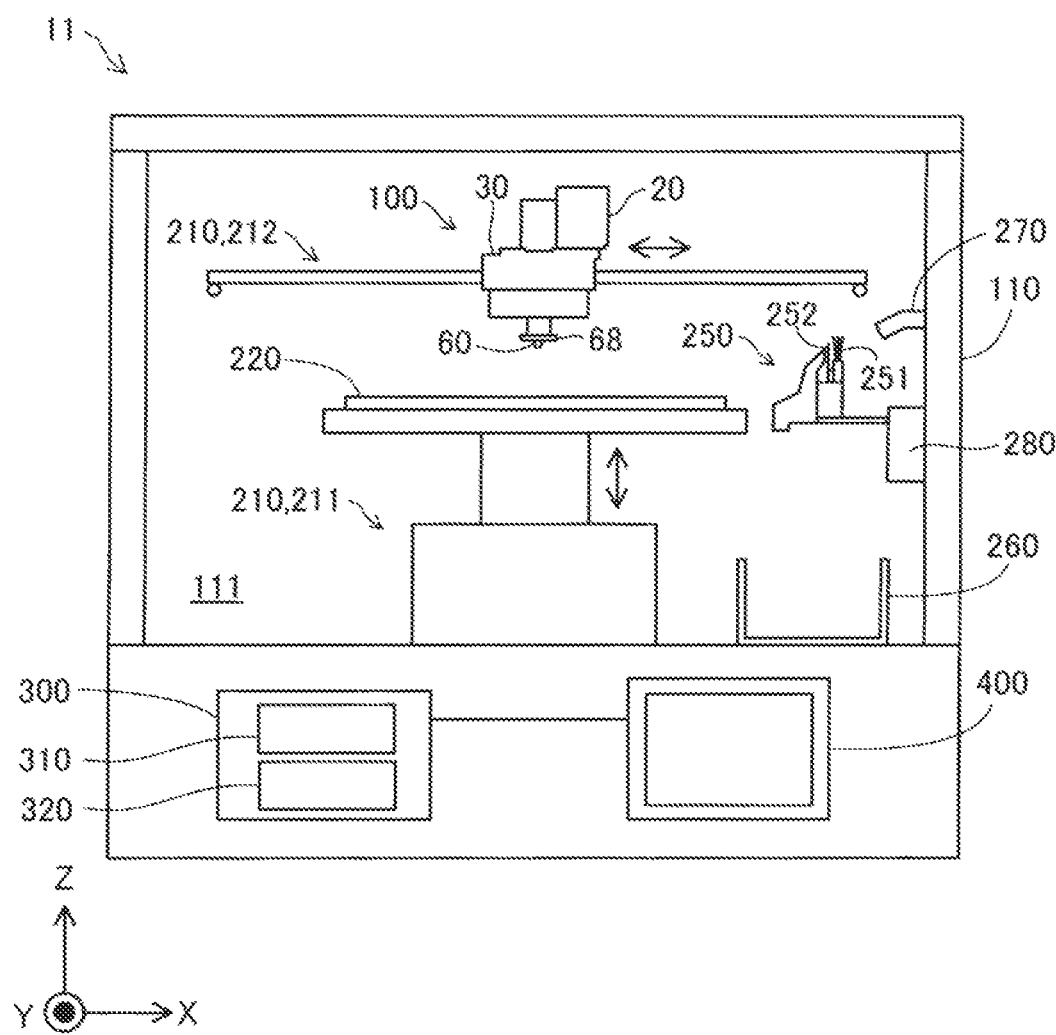
FIG. 17 is a diagram showing a schematic configuration of a three-dimensional shaping apparatus in a third embodiment.

FIG. 17 is a diagram showing a schematic configuration of a three-dimensional shaping apparatus 11 in a third embodiment. The three-dimensional shaping apparatus 11 in the third embodiment is different from the three-dimensional shaping apparatus 10 in the first embodiment in that the three-dimensional shaping apparatus 11 includes a waste-material removing section 270. The other components are the same as the components of the three-dimensional shaping apparatus 10 in the first embodiment.

The waste-material removing section 270 removes a waste material adhering to the brush 251 or the blade 252 included in the cleaning mechanism 250. The waste-material removing section 270 in this embodiment is configured by an air compressor that jets compressed air. The control section 300 drives the waste-material removing section 270 and removes the waste material adhering to the cleaning mechanism 250 at the start time or an end time of the three-dimensional shaping apparatus shown in FIG. 6 or FIG. 15 or before the execution or after the execution of the cleaning processing in step S140.

According to the third embodiment explained above, it is possible to remove the waste material adhering to the brush 251 and the blade 252 using the waste-material removing section 270. Therefore, it is possible to more effectively prevent the waste material adhering to the cleaning mechanism 250 from adhering to the nozzle 60 again.

The waste-material removing section 270 may remove both of the waste material adhering to the brush 251 and the waste material adhering to the blade 252 or may be directed to one of the brush 251 and the blade 252 to thereby remove the waste material adhering to the one of the brush 251 and the blade 252.

The waste-material removing section 270 may be configured by not only the air compressor but also, for example, a brush capable of moving on the cleaning mechanism 250. The waste-material removing section 270 may rub the brush against the cleaning mechanism 250 to thereby remove the waste material adhering to the brush 251 and the blade 252.

D. Fourth Embodiment

Figure 18:
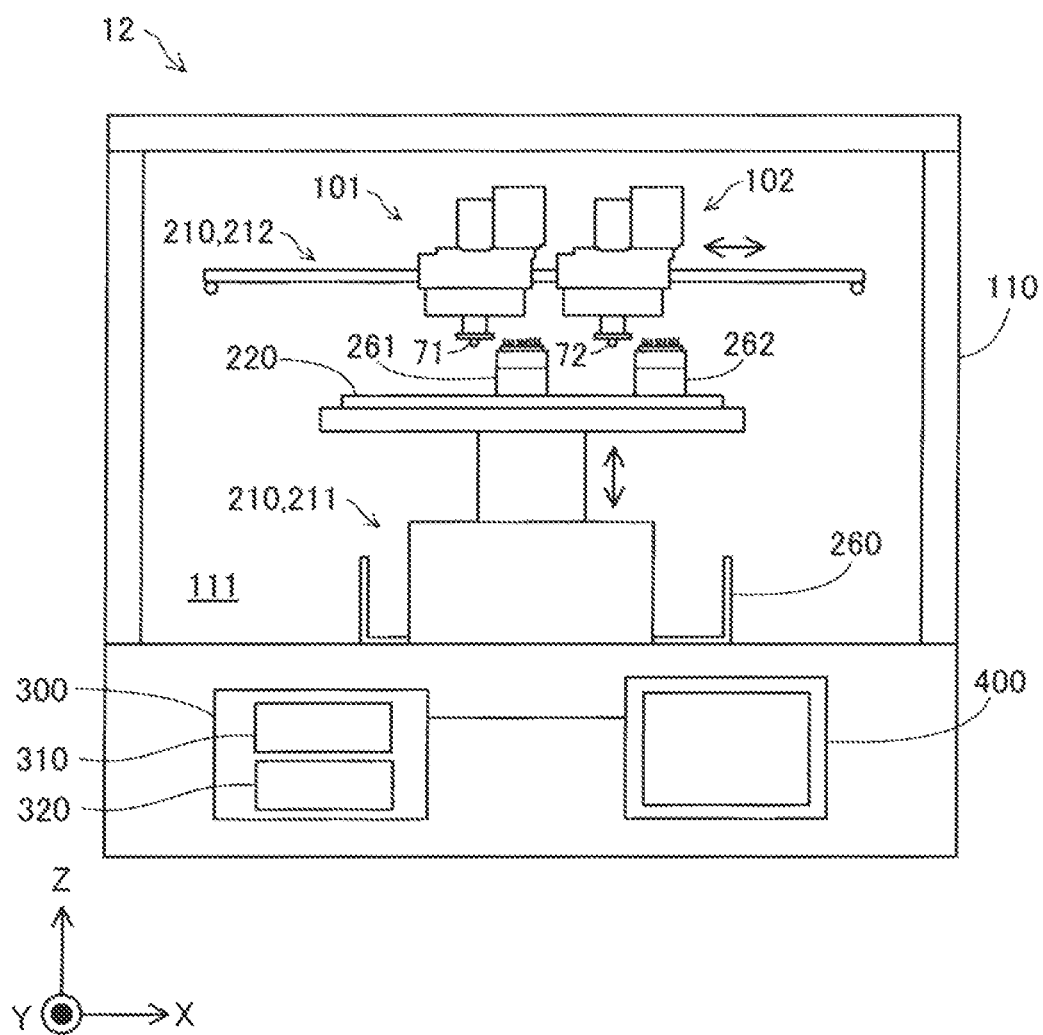
FIG. 18 is a diagram showing a schematic configuration of a three-dimensional shaping apparatus in a fourth embodiment.

FIG. 18 is a diagram showing a schematic configuration of a three-dimensional shaping apparatus 12 in a fourth embodiment. In the fourth embodiment, the three-dimensional shaping apparatus 12 includes two ejecting sections and two cleaning mechanisms. Specifically, the ejecting sections in this embodiment include a first ejecting section 101 including a first nozzle 71 that ejects a first shaping material and a second ejecting section 102 including a second nozzle 72 that ejects a second shaping material. The first shaping material and the second shaping material can be, for example, a combination of a material for shaping and a material for support. Besides, the first shaping material and the second shaping material can be, for example, a combination of materials having different colors and different qualities. The configuration of the first ejecting section 101 and the second ejecting section 102 is the same as the configuration of the ejecting section 100 in the first embodiment.

The cleaning mechanisms in this embodiment include a first cleaning mechanism 261 including a brush and a blade for cleaning the first nozzle 71 and a second cleaning mechanism 262 including a brush and a blade for cleaning the second nozzle 72. The configuration of the first cleaning mechanism 261 and the second cleaning mechanism 262 is the same as the configuration of the cleaning mechanism 250 in the first embodiment. In this embodiment, it is assumed that the two cleaning mechanisms 261 and 262 are disposed at a predetermined interval in the X direction and purge sections, blades, and brushes included in the respective cleaning mechanisms 261 and 262 are arranged in the −Y direction in this order. In this embodiment, it is assumed that the longitudinal direction of the first cleaning mechanism 261 and the second cleaning mechanism 262 is the X direction.

In this embodiment, the control section 300 executes the three-dimensional shaping processing shown in FIG. 6 using the two ejecting sections 101 and 102 and the two cleaning mechanisms 261 and 262. In the three-dimensional shaping processing in this embodiment, the two ejecting sections 101 and 102 are properly used and the stacking processing is executed. In the cleaning processing shown in FIG. 9, the control section 300 causes the first nozzle 71 included in the first ejecting section 101 and the second nozzle 72 included in the second ejecting section 102 to respectively perform the cleaning operation shown in FIG. 7 to thereby simultaneously clean the first nozzle 71 and the second nozzle 72 using the first cleaning mechanism 261 and the second cleaning mechanism 262.

According to the fourth embodiment explained above, the two nozzles 71 and 72 included in the two ejecting sections 101 and 102 can be simultaneously cleaned. Therefore, it is possible to reduce a time required for the cleaning processing. As a result, it is possible to efficiently execute the three-dimensional shaping processing. In this embodiment, an example is explained in which the two ejecting sections and the two cleaning mechanisms are included in the three-dimensional shaping apparatus 12. However, three or more ejecting sections and three or more cleaning mechanisms may be included in the three-dimensional shaping apparatus 12.

E. Fifth Embodiment

Figure 19:
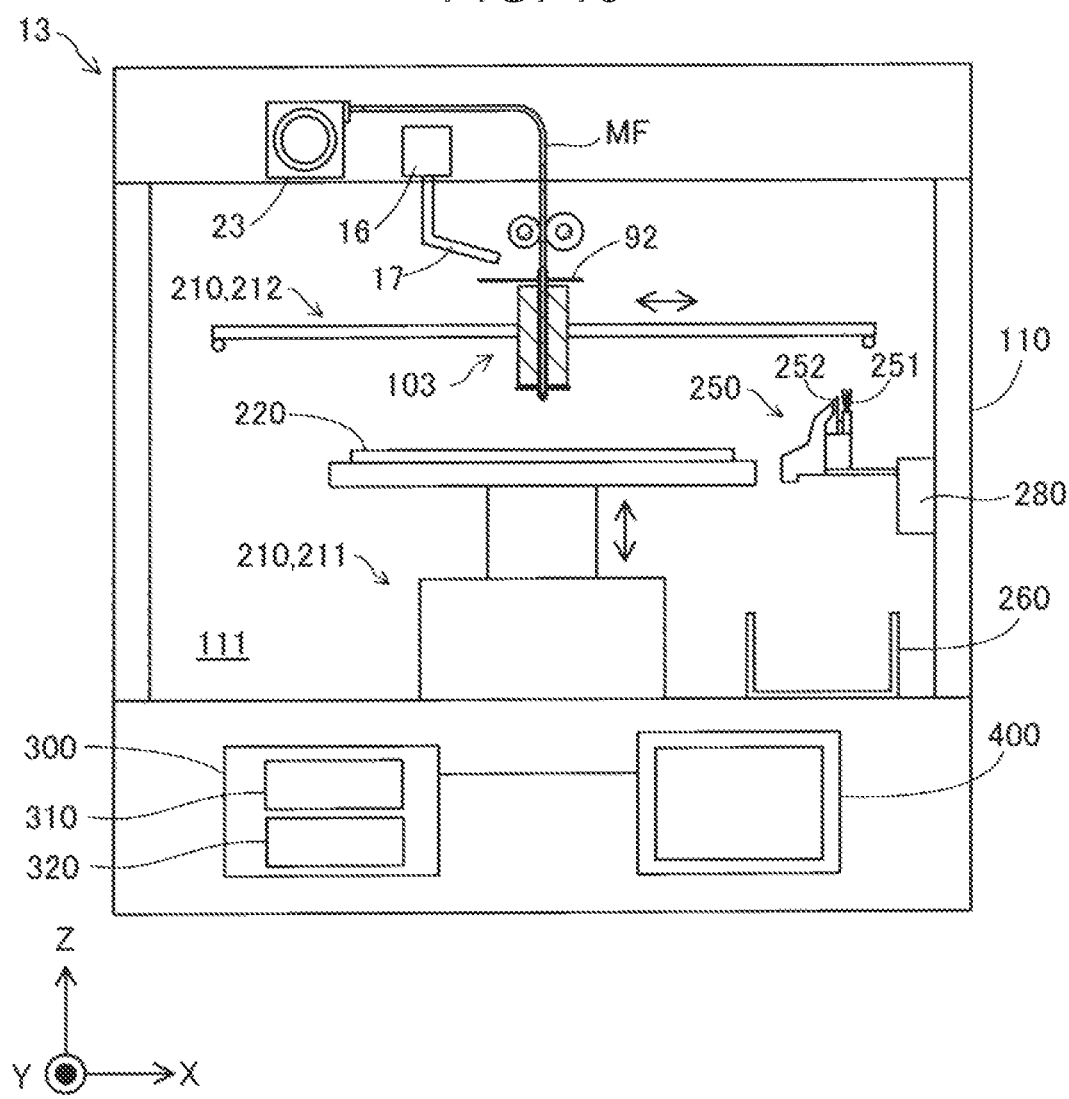
FIG. 19 is a diagram showing a schematic configuration of a three-dimensional shaping apparatus in a fifth embodiment.

FIG. 19 is a diagram showing a schematic configuration of a three-dimensional shaping apparatus 13 in a fifth embodiment. The three-dimensional shaping apparatus 13 in the fifth embodiment is different from the three-dimensional shaping apparatus 10 in the first embodiment mainly in the configuration of an ejecting section. The other components and processing content of three-dimensional shaping processing are the same as the components and the processing content of the three-dimensional shaping processing of the three-dimensional shaping apparatus 10 in the first embodiment. Accordingly, in the following explanation, the configuration of the ejecting section is mainly explained.

The three-dimensional shaping apparatus 13 in this embodiment includes an ejecting section 103, a material storing section 23, the housing 110, the driving section 210, the stage 220, and the control section 300. The three-dimensional shaping apparatus 13 further includes a blower 16. The blower 16 is configured as an air blower that performs air blasting toward the ejecting section 103 via a manifold 17. In this embodiment, a part of the manifold 17, the ejecting section 103, the driving section 210, and the stage 220 are housed in the shaping space 111 in the housing 110.

The material storing section 23 in this embodiment is configured as a holder that stores a filament-like material. The material storing section 23 is configured to be capable of unwinding the material stored on the inside to the outside of the material storing section 23.

Figure 20:
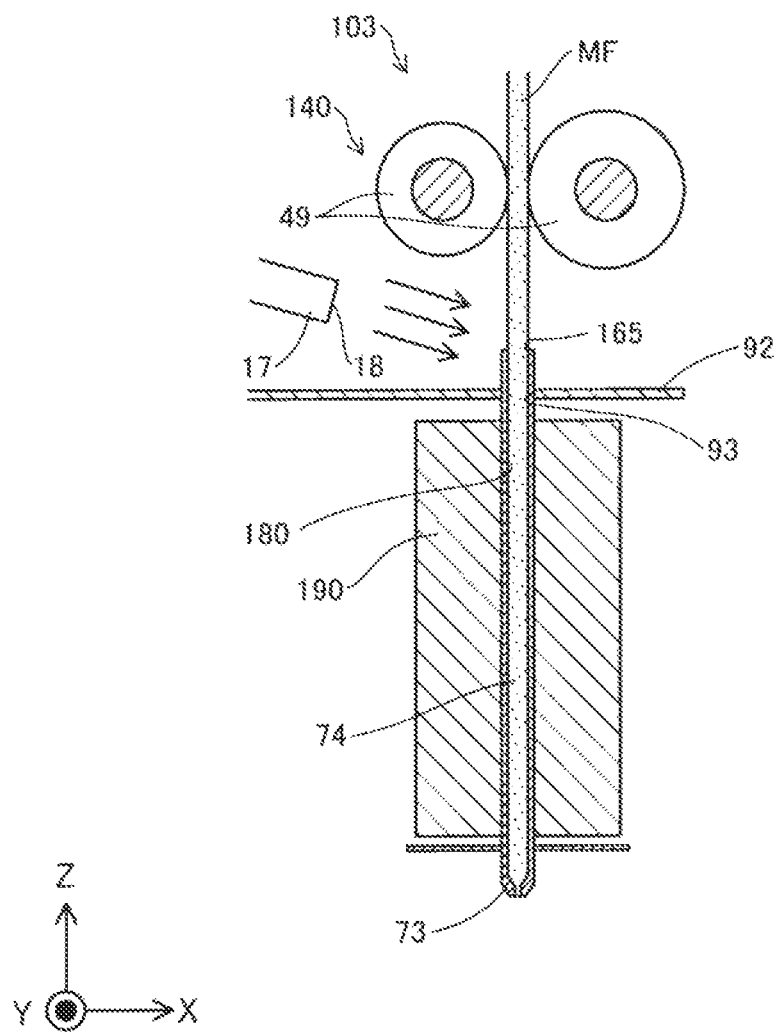
FIG. 20 is a diagram showing a schematic configuration of an ejecting section in the fifth embodiment.

FIG. 20 is a diagram showing a schematic configuration of the ejecting section 103 in this embodiment. The ejecting section 103 includes a heating block 190 including a heater and functioning as a plasticizing mechanism in which a through-hole 180 is provided, a nozzle 73 detachably attached to the through-hole 180, and a material conveying mechanism 140 that conveys a material MF toward a nozzle channel 74 of the nozzle 73 attached to the heating block 190. The ejecting section 103 further includes a shield 92 that is disposed between the material conveying mechanism 140 and the heating block 190 in the Z direction and suppresses heat transfer from the heating block 190 to the material conveying mechanism 140. Unlike the material conveying mechanism 40 in the first embodiment, the material conveying mechanism 140 in this embodiment does not include the screw case 31 and the screw 41 and is configured by two wheels 49. Unlike the heating block 90 in the first embodiment, the heating block 190 does not include the barrel 50 and the case 91.

The nozzle 73 in this embodiment is inserted through the through-hole 180 and a shield opening 93 provided in the shield 92 from the −Z direction to thereby be attached to the heating block 190. In this embodiment, the dimension in the Z direction of the nozzle 73 and the dimension in the Z direction of the nozzle channel 74 are longer than the dimension in the Z direction of the through-hole 180. In this embodiment, an inflow port 165 provided at the rear end of the nozzle 73 is located in the +Z direction of the heating block 190, more specifically, on the +Z direction side of the shield 92.

The two wheels 49 configuring the material conveying mechanism 140 draw out, with the rotation thereof, the material MF in the material storing section 23 to the outside and guide the material MF to between the two wheels 49 and conveys the material MF toward the nozzle channel 74 of the nozzle 73 attached to the through-hole 180 of the heating block 190. The heating block 190 plasticizes, with the heat of a not-shown heater incorporated in the heating block 190, the material MF conveyed into the nozzle channel 74 of the nozzle 73.

The material MF in this embodiment is cooled, near the inflow port 165 of the nozzle 73, by air sent from the blower 16 via the manifold 17. Consequently, plasticization of the material MF near the inflow port 165 is suppressed and the material MF is efficiently conveyed into the inflow port 165. An outlet end 18 of the manifold 17 is located on the +Z direction side of the shield 92. Consequently, the air delivered from the manifold 17 is easily guided to near the inflow port 165 by the shield 92. Therefore, the material MF near the inflow port 165 is efficiently cooled.

The configuration of the cleaning mechanism 250 in this embodiment is the same as the configuration in the first embodiment. However, the distal end of the brush 251 does not come into contact with the shield 92 during the cleaning processing. This is because, in this embodiment, the shield 92 is located above the heating block 190.

In the three-dimensional shaping apparatus 13 in this embodiment explained above as well, it is possible to clean the nozzle 73 using the cleaning mechanism 250.

F. Other Embodiments (F1) In the embodiments, the control section 300 selects the cleaning operation to be used out of the plurality of cleaning operations in which the contact start positions are different and executes the cleaning processing. In contrast, the control section 300 may select the cleaning operation to be used out of the plurality of cleaning operations in which the shapes of the tracks are different shown in FIGS. 7 and 11 to 14.

(F2) In the embodiments, the control section 300 moves the nozzle 60 from the blade 252 side to the brush 251 side at the start time of the cleaning operation. In contrast, the control section 300 may move the nozzle 60 from the brush 251 side to the blade 252 side at the start time of the cleaning operation.

(F3) The control section 300 may respectively store, at the start time of the cleaning operation, the cleaning operation for moving the nozzle 60 from the blade 252 side to the brush 251 side and the cleaning operation for moving the nozzle 60 from the brush 251 side to the blade 252 side as cleaning operations in which tracks are different and select the cleaning operation to be used out of the cleaning operations. The control section 300 may respectively store a cleaning operation having a track from the +Y direction to the −Y direction and a cleaning operation having a track from the −Y direction to the +Y direction and select the cleaning operation to be used out of the cleaning operations.

(F4) In the embodiments, the control section 300 changes the contact start position in the cleaning operation according to the shaping progress ratio. In contrast, the control section 300 may select the contact start position at random using a random number. However, even when the control section 300 selects the contact start position at random, it is preferable to select the contact start position at random from a range excluding the contact start position in the last cleaning operation.

(F5) In the embodiments, the cleaning mechanism 250 includes the purge section 253. In contrast, the cleaning mechanism 250 may not include the purge section 253.

(F6) In the embodiments, the nozzles 60 and 73 include the shields 68 and 92. In contrast, the nozzles 60 and 73 may not include the shields 68 and 92.

(F7) In the embodiment, the recording of the execution history of the cleaning processing and the wear determination processing may not be executed. That is, the processing in steps S160 to S190 in FIGS. 6 and 15 may be omitted.

(F8) In the embodiments, the cleaning mechanism 250 is disposed in the region different from the stage 220 in the horizontal direction. In contrast, the cleaning mechanism 250 may be disposed, in the horizontal direction, in a region overlapping the stage 220, the region being different from a shaping region of the stage 220 where the three-dimensional shaped object is shaped. Consequently, it is possible to provide a compact three-dimensional shaping apparatus.

G. Other Aspects

The present disclosure is not limited to the embodiments explained above and can be realized in various configurations without departing from the gist of the present disclosure. For example, technical features of the embodiments corresponding to technical features in aspects described below can be substituted and combined as appropriate in order to solve a part or all of the problems described above or in order to achieve a part or all of the effects described above. Unless the technical feature are explained as essential technical features in this specification, the technical features can be deleted as appropriate.

(1) According to a first aspect of the present disclosure, a three-dimensional shaping apparatus is provided. The three-dimensional shaping apparatus includes: an ejecting section including a plasticizing mechanism for plasticizing a plasticizing material and generating a shaping material and a nozzle and configured to eject the shaping material from the nozzle; a stage on which the shaping material is stacked; a driving section configured to change relative positions of the ejecting section and the stage; a cleaning mechanism including a brush and a blade; and a control section configured to execute cleaning processing for cleaning the nozzle and control the ejecting section and the driving section to stack layers on the stage. The brush and the blade are disposed at height where the brush and the blade come into contact with the nozzle. The brush and the blade have a melting point higher than a plasticizing temperature of the plasticizing material and have hardness lower than hardness of the nozzle. The control section causes, in the cleaning processing, the nozzle to reciprocate to traverse the cleaning mechanism a plurality of times to execute a cleaning operation for bringing at least one of the brush and the blade and the nozzle to come into contact. The control section causes, in the cleaning operation, the nozzle to reciprocate to come into contact with the brush or the blade in different positions of the brush or the blade. Temperature of the nozzle in the cleaning operation is lower than temperature of the nozzle at a stacking time of the layers.

With such an aspect, in the cleaning operation, the nozzle reciprocates to come into contact with different positions of the brush or the blade and the temperature of the nozzle in the cleaning operation is lower than the temperature of the nozzle at the stacking time of the layers. Therefore, it is possible to prevent the waste material adhering to the cleaning mechanism from adhering to the nozzle again. As a result, it is possible to prevent a waste material adhering to the cleaning mechanism from affecting shaping accuracy.

(2) In the aspect, the control section may execute a selected cleaning operation among a plurality of cleaning operations in which tracks for moving the nozzle are different. With such an aspect, it is possible to properly use the plurality of cleaning operations in which the tracks for moving the nozzle are different and clean the nozzle.

(3) In the aspect, contact start positions of the nozzle and the cleaning mechanism may be respectively different in the plurality of cleaning operations in which the tracks are different. With such an aspect, it is possible to effectively prevent the waste material from adhering to a specific position of the cleaning mechanism. Therefore, it is possible to more effectively prevent the waste material adhering to the cleaning mechanism from adhering to the nozzle again.

(4) In the aspect, the control section may execute a cleaning operation different from a cleaning operation executed last time. With such an aspect, it is possible to prevent the waste material from adhering to a specific position of the cleaning mechanism. Therefore, it is possible to more effectively prevent the waste material adhering to the cleaning mechanism from adhering to the nozzle again.

(5) In the aspect, the three-dimensional shaping apparatus may further include a storing section configured to store a plurality of types of cleaning patterns including the plurality of cleaning operations in which the tracks are different, and, every time a three-dimensional shaped object is shaped, the control section may execute the cleaning processing using a cleaning pattern selected out of the plurality of types of cleaning patterns. With such an aspect, it is possible to prevent the waste material from adhering to a specific position of the cleaning mechanism. Therefore, it is possible to more effectively prevent the waste material adhering to the cleaning mechanism from adhering to the nozzle again.

(6) In the aspect, the control section may cause a storing section to store an execution history of the cleaning processing. With such an aspect, it is possible to check a worn state of the cleaning mechanism using the execution history.

(7) In the aspect, the three-dimensional shaping apparatus may further include a waste-material removing section configured to remove a waste material adhering to the brush or the blade. With such an aspect, it is possible to more effectively prevent the waste material adhering to the cleaning mechanism from adhering to the nozzle again.

(8) In the aspect, the nozzle may include a shield above a distal end of the nozzle, a distal end of the brush may be disposed at height where the distal end of the brush comes into contact with the shield, and a distal end of the blade may be disposed at height where the distal end of the blade does not come into contact with the shield. With such an aspect, it is possible to remove a material adhering to the shield.

(9) In the aspect, the cleaning mechanism may include a purge section, the blade may be disposed between the purge section and the brush, the purge section may include a first inclined surface, a second inclined surface, and a third inclined surface in descending order of distances from the blade and in ascending order of heights of positions in the vertical direction, and inclination angles from a horizontal plane of the second inclined surface and the third inclined surface may be larger than an inclination angle from the horizontal plane of the first inclined surface.

(10) In the aspect, in the cleaning processing, the control section may move the nozzle toward the brush and the blade after causing the nozzle to eject the shaping material on the purge section. With such an aspect, it is possible to clean the nozzle after removing a material remaining in the nozzle.

(11) According to a second aspect of the present disclosure, there is provided a manufacturing method for a three-dimensional shaped object in a three-dimensional shaping apparatus including: an ejecting section including a plasticizing mechanism for plasticizing a plasticizing material and generating a shaping material and a nozzle and configured to eject the shaping material from the nozzle; a stage on which the shaping material is stacked; a driving section configured to change relative positions of the ejecting section and the stage; and a cleaning mechanism including a brush and a blade, the brush and the blade being disposed at height where the brush and the blade come into contact with the nozzle, the brush and the blade having a melting point higher than a plasticizing temperature of the plasticizing material and having hardness lower than hardness of the nozzle. The manufacturing method includes: a stacking step for controlling the ejecting section and the driving section to stack layers on the stage; and a cleaning step for causing the nozzle to reciprocate to traverse the cleaning mechanism a plurality of times to execute a cleaning operation for bringing at least one of the brush and the blade and the nozzle to come into contact. In the cleaning step, in the cleaning operation, the nozzle is caused to reciprocate to come into contact with the brush or the blade in different positions of the brush or the blade. Temperature of the nozzle in the cleaning operation is lower than temperature of the nozzle at a stacking time of the layers.

What is claimed is:

1. A three-dimensional shaping apparatus comprising:
   an ejecting head including:
      a plasticizing mechanism including a screw and a heater, the plasticizing mechanism being configured to plasticize a plasticizing material to generate a shaping material; and
      a nozzle configured to eject the shaping material therefrom;
   a stage on which the shaping material is stacked as layers;
   a motor configured to change relative positions between the ejecting head and the stage;
   a cleaning mechanism including a brush and a blade, each of the brush and the blade extending along a first direction so that the brush and the blade are parallel to each other and face each other along a second direction perpendicular to the first direction;
   a memory configured to store a program; and
   a processor configured to execute the program so as to:
      cause the nozzle to reciprocally move along a zigzag path in a cleaning operation in a plan view such that the nozzle passes from a side of the blade toward a side of the brush to contact a first point of at least one of the brush and the blade, and the nozzle passes from the side of the brush toward the side of the blade to contact a second point of at least one of the brush and the blade, the first point and the second point are different positions in the first direction,
   wherein the brush and the blade are disposed at a height where the brush and the blade come into contact with the nozzle,
   each of the brush and the blade has a melting point higher than a plasticizing temperature of the plasticizing material and has a hardness lower than a hardness of the nozzle,
   a temperature of the nozzle in the cleaning operation is lower than a temperature of the nozzle at a stacking time of the layers,
   the cleaning operation is configured with a plurality of cleaning operations,
   the processor is configured to select and perform a first cleaning operation corresponding to a present shaping progress ratio out of the plurality of cleaning operations, and contact start positions, at which the nozzle and the cleaning mechanism are firstly contacted to each other, are respectively different in the plurality of cleaning operations.

2. The three-dimensional shaping apparatus according to claim 1,
   the processor is configured to cause the nozzle to perform a selected cleaning operation among the plurality of cleaning operations in which tracks for moving the nozzle are different.

3. The three-dimensional shaping apparatus according to claim 2,
   wherein the contact start positions, at which the nozzle and the cleaning mechanism are firstly contacted to each other, are respectively different in the plurality of cleaning operations in which the tracks for moving the nozzle are different.

4. The three-dimensional shaping apparatus according to claim 1,
   wherein the processor is further configured to perform another cleaning operation different from the first cleaning operation that has been performed.

5. The three-dimensional shaping apparatus according to claim 2,
   wherein the memory is further configured to store a plurality of types of cleaning patterns including the plurality of cleaning operations in which the tracks for moving the nozzle are different, and
   every time a three-dimensional shaped object is shaped, the processor is configured to perform the cleaning processing using a cleaning pattern selected out of the plurality of types of cleaning patterns.

6. The three-dimensional shaping apparatus according to claim 1,
   wherein the processor is further configured to cause the memory to store an execution history of the cleaning operation.

7. The three-dimensional shaping apparatus according to claim 1, further comprising:
   an air blower configured to remove a waste material adhering to the brush or the blade.

8. The three-dimensional shaping apparatus according to claim 1, wherein
   the nozzle includes a shield above a distal end of the nozzle,
   a distal end of the brush is disposed at a height where the distal end of the brush comes into contact with the shield, and
   a distal end of the blade is disposed at a height where the distal end of the blade does not come into contact with the shield.

9. The three-dimensional shaping apparatus according to claim 1, wherein
   the cleaning mechanism includes a purge ledge,
   the blade is disposed between the purge ledge and the brush,
   the purge ledge includes a first inclined surface, a second inclined surface, and a third inclined surface in descending order of distances from the blade and in ascending order of heights of positions in a vertical direction, and
   each of a first inclination angle between a first horizontal plane and the second inclined surface and a second inclination angle between a second horizontal plane and the third inclined surface is larger than a third inclination angle between a third horizontal plane and the first inclined surface.

10. The three-dimensional shaping apparatus according to claim 9,
wherein, in the cleaning operation, the processor is configured to cause the nozzle to move toward the brush and the blade after the processor causes the nozzle to eject the shaping material on the purge ledge.

11. The three-dimensional shaping apparatus according to claim 1,
wherein a modulus of elasticity of the blade is higher than a modulus of elasticity of the brush.

12. The three-dimensional shaping apparatus according to claim 1, further comprising another heater provided in the nozzle,
wherein, in the cleaning operation, the processor is configured to stop an operation of the another heater after the ejection of the shaping material from the nozzle is stopped until the processor ends the cleaning operation.

13. The three-dimensional shaping apparatus according to claim 1,
wherein the processor is configured to count a number of times at which the nozzle passes through each of a plurality of positions along the first direction of the cleaning mechanism.

14. A three-dimensional shaping apparatus comprising:
an ejecting head including:
a plasticizing mechanism including a screw and a heater, the plasticizing mechanism being configured to plasticize a plasticizing material to generate a shaping material; and
a nozzle configured to eject the shaping material therefrom;
a stage on which the shaping material is stacked as layers;
a motor configured to change relative positions between the ejecting head and the stage;
a cleaning mechanism including a brush and a blade, each of the brush and the blade extending along a first direction so that the brush and the blade are parallel to each other and face each other along a second direction perpendicular to the first direction;
a memory configured to store a program; and
a processor configured to execute the program so as to:
cause the nozzle to reciprocally move along a zigzag path in a cleaning operation in a plan view such that the nozzle passes from a side of the blade toward a side of the brush to contact a first point of at least one of the brush and the blade, and the nozzle passes from the side of the brush toward the side of the blade to contact a second point of at least one of the brush and the blade, the first point and the second point are different positions in the first direction,
wherein the brush and the blade are disposed at a height where the brush and the blade come into contact with the nozzle,
each of the brush and the blade has a melting point higher than a plasticizing temperature of the plasticizing material and has a hardness lower than a hardness of the nozzle,
a temperature of the nozzle in the cleaning operation is lower than a temperature of the nozzle at a stacking time of the layers,
in the cleaning operation, the processor is configured to cause the nozzle to traverse and contact the brush a first number of times and cause the nozzle to traverse and contact the blade a second number of times, and
the first number of times is larger than the second number of times.

15. A three-dimensional shaping apparatus comprising:
an ejecting head including:
a plasticizing mechanism configured to plasticize a plasticizing material to generate a shaping material; and
a nozzle configured to eject the shaping material therefrom;
a stage on which the shaping material is stacked as layers;
a motor configured to change relative positions between the ejecting head and the stage;
a cleaning mechanism including a brush and a blade;
a memory configured to store a program; and
a processor configured to execute the program so as to:
cause the nozzle to reciprocally move along a zigzag path in a single cleaning operation in a plan view such that the nozzle passes from a side of the blade toward a side of the brush and from the side of the brush toward the side of the blade several times to contact at least one of the brush and the blade at different positions several times,
wherein the brush and the blade are disposed at a height where the brush and the blade come into contact with the nozzle,
each of the brush and the blade has a melting point higher than a plasticizing temperature of the plasticizing material and has a hardness lower than a hardness of the nozzle,
the nozzle contacts the different positions of at least one of the brush and the blade every time the nozzle passes at least one of the brush and the blade during an entirety of the single cleaning operation, and
a temperature of the nozzle in the cleaning operation is lower than a temperature of the nozzle at a stacking time of the layers.

* * * * *